United States Patent
Haziza et al.

(10) Patent No.: US 9,871,577 B2
(45) Date of Patent: *Jan. 16, 2018

(54) GLOBAL COMMUNICATION NETWORK

(71) Applicant: Google Inc., Mountain View, CA (US)

(72) Inventors: Dedi David Haziza, Sunnyvale, CA (US); Arnd Geis, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 116 days.

This patent is subject to a terminal disclaimer.

(21) Appl. No.: 14/954,235

(22) Filed: Nov. 30, 2015

(65) Prior Publication Data
US 2017/0155443 A1    Jun. 1, 2017

(51) Int. Cl.
| | | |
|---|---|---|
| *H04B 1/44* | (2006.01) | |
| *H04B 7/185* | (2006.01) | |
| *H04B 1/69* | (2011.01) | |
| *H04W 72/08* | (2009.01) | |
| *H04W 64/00* | (2009.01) | |

(52) U.S. Cl.
CPC .......... *H04B 7/18513* (2013.01); *H04B 1/69* (2013.01); *H04W 64/003* (2013.01); *H04W 72/085* (2013.01)

(58) Field of Classification Search
CPC combination set(s) only.
See application file for complete search history.

(56) References Cited

U.S. PATENT DOCUMENTS

| | | |
|---|---|---|
| 7,184,489 B2 | 2/2007 | Wang et al. |
| 7,426,246 B2 | 9/2008 | Chen et al. |
| 7,990,874 B2 | 8/2011 | del Rio Herrero et al. |
| 8,676,191 B2 | 3/2014 | Soumier et al. |
| 8,885,503 B2 | 11/2014 | Lever et al. |
| 9,608,714 B2 * | 3/2017 | Haziza ................ H04B 1/707 |
| 2008/0258986 A1 | 10/2008 | Milbrandt et al. |
| 2010/0079339 A1 | 4/2010 | Yoon et al. |
| 2013/0155944 A1 | 6/2013 | Touret |
| 2015/0124855 A1 | 5/2015 | Morris et al. |
| 2016/0119938 A1 * | 4/2016 | Frerking ............ H04W 72/10 370/316 |

FOREIGN PATENT DOCUMENTS

| | | | |
|---|---|---|---|
| WO | WO 01/80356 | * | 10/2001 |
| WO | WO-2006080661 A1 | | 8/2006 |
| WO | WO-2012048287 A2 | | 4/2012 |

OTHER PUBLICATIONS

International Search Report and Written Opinion for PCT related Application No. PCT/US2016/061813 dated Feb. 24, 2017.

* cited by examiner

*Primary Examiner* — Frank Duong
(74) *Attorney, Agent, or Firm* — Honigman Miller Schwartz and Cohn LLP

(57) ABSTRACT

A method for modifying a communication signal for transmission from a source to a destination includes identifying a target platform for communicating with a communication device and establishing a communication connection between the target platform and the communication device. The method includes identifying an available communication channel for communicating data between the target platform and the communication device, and receiving control inputs from one or more sensors. The method also includes determining a pseudo random noise spreading code based on the received control inputs, and modifying a communication signal by multiplying the communication signal with the pseudo random noise spreading code. Additionally, the method includes causing transmission of the modified communication signal from the communication device to the target platform through the available communication channel, the modified communication signal being transmitted below a thermal noise of the available communication channel.

18 Claims, 12 Drawing Sheets

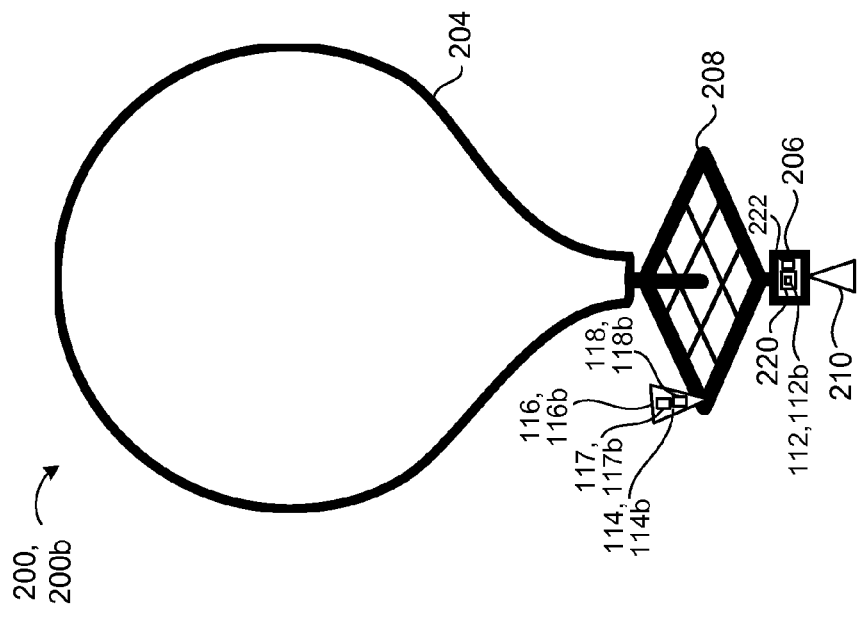
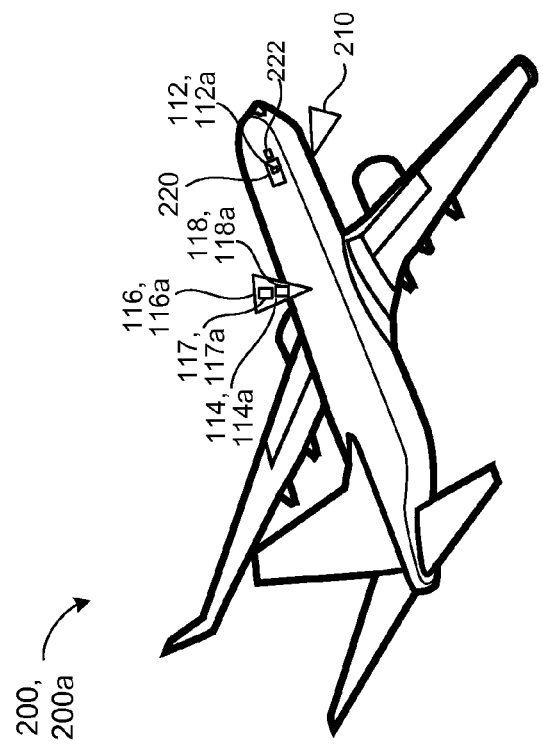
FIG. 3A
FIG. 3B

GLOBAL COMMUNICATION NETWORK

TECHNICAL FIELD

This disclosure relates to global communication networks.

BACKGROUND

In general, a communication network is a large distributed system for receiving information (signal) and transmitting the information to a destination. Over the past few decades the demand for communication access has dramatically increased. Although conventional wire and fiber landlines, cellular networks, and geostationary satellite systems have continuously been increasing to accommodate the growth in demand, the existing communication infrastructure is still not large enough to accommodate the increase in demand. In addition, some areas of the world are not connected to a communication network and therefore cannot be part of the global community where everything is connected to the internet.

Satellites are used to provide communication services to areas where wired cables cannot reach. Satellites may be geostationary or non-geostationary. Geostationary satellites remain permanently in the same area of the sky as viewed from a specific location on earth, because the satellite is orbiting the equator with an orbital period of exactly one day. Non-geostationary satellites typically operate in low- or mid-earth orbit, and do not remain stationary relative to a fixed point on earth; the orbital path of a satellite can be described in part by the plane intersecting the center of the earth and containing the orbit. In addition, the communication devices significantly increase the cost of building, launching and operating each satellite; they also greatly complicate the design and development of the satellite communication system and associated antennas and mechanisms to allow each satellite to acquire and track other satellites whose relative position is changing. Each antenna has a mechanical or electronic steering mechanism, which adds weight, cost, vibration, and complexity to the satellite, and increases risk of failure. Requirements for such tracking mechanisms are much more challenging for inter-satellite links designed to communicate with satellites in different planes than for links, which only communicate with nearby satellites in the same plane, since there is much less variation in relative position. Similar considerations and added cost apply to high-altitude communication balloon systems with inter-balloon links.

SUMMARY

One aspect of the disclosure provides a method for modifying a communication signal for transmission from a source to a destination. The method includes identifying, by data processing hardware, a target platform for communicating with a communication device and establishing a communication connection between the target platform and the communication device. The method also includes identifying, by the data processing hardware, an available communication channel for communicating data between the target platform and the communication device and receiving, at the data processing hardware, control inputs from one or more sensors. The method further includes determining, by the data processing hardware, a pseudo random noise spreading code based on the received control inputs and modifying, by the data processing hardware, a communication signal by multiplying the communication signal with the pseudo random noise spreading code. Additionally, the method includes causing, by the data processing hardware, transmission of the modified communication signal from the communication device to the target platform through the available communication channel, the modified communication signal being transmitted below a thermal noise of the available communication channel.

Implementations of the disclosure may include one or more of the following optional features. In some implementations, the control inputs include at least one of a geolocation, an antenna gain-to-noise-temperature associated with the target platform, an equivalent isotropically radiated power associated with the target platform, an antenna pointing angle associated with the communication device, a received signal strength indicator of the target platform, or a signal-to-noise ratio of a communication between the target platform and the communication device. The method may also include adjusting, by the data processing hardware, the pseudo random noise spreading code when at least one of the control inputs is updated.

In some examples, the method includes receiving, at the data processing hardware, a global positioning signal of the communication device from a global positioning device in communication with the data processing hardware and receiving, at the data processing hardware, an orbital location of the target platform from the target platform. The method may also include determining, by the data processing hardware, an antenna pointing angle with respect to the target platform and associated with an antenna positioned on the communication device based on the global positioning signal of the communication device and the orbital location of the target platform. The method also includes modifying, by the data processing hardware, the pseudo random noise spreading code based on the antenna pointing angle. Before modifying the communication signal, the method may include generating, by the data processing hardware, the communication signal. Before modifying the communication signal, the method may also include receiving, at the data processing hardware, the communication signal.

In some examples, identifying the target platform includes tracking, by the data processing hardware, global positions of target platforms, and determining, by the data processing hardware, a collection of target platforms and available communication channels for transmitting the communication signal at a communication time of the transmission of the modified communication signal from the communication device. Identifying the target platform also includes selecting, by the data processing hardware, the target platform from the collection of target platforms, and querying a data source stored in memory hardware in communication with the data processing hardware for a target platform for communication with the communication device and available communication channels for transmitting the communication signal at a communication time of the transmission of the modified communication signal from the communication device.

The communication device may include a phased array antenna. Establishing the communication connection between the target platform and the communication device may include steering one or more array elements of the phased array antenna to move a corresponding communication beam. A ground station or a source target platform may include the data processing hardware.

Another aspect of the disclosure provides a communication system for modifying a communication signal for transmission from a source to a destination. The communication system includes a signal spreading device and a phased array antenna system in communication with the signal spreading device. The signal spreading device is configured to receive a communication signal, receive one or more control inputs from one or more sensory devices, determine a pseudo random noise spreading code based on the one or more control inputs and modify the communication signal by multiplying the communication signal with the pseudo random noise spreading code. The phased array antenna system includes a phased array antenna and data processing hardware configured to perform operations. The operations include identifying a target platform for communicating with the phased array antenna, establishing a communication connection between the target platform and the communication system, identifying an available communication channel for communicating data between the target platform and the communication system, and transmitting the modified communication signal from the phased array antenna to the target platform through the available communication channel. The modified communication signal is transmitted below a thermal noise of the available communication channel.

Implementations of the disclosure may include one or more of the following optional features. The control inputs may include at least one of a geolocation, an antenna gain-to-noise-temperature associated with the target platform, an equivalent isotropically radiated power associated with the target platform, an antenna pointing angle associated with the communication device, a received signal strength indicator of the target platform, or a signal-to-noise ratio of a communication between the target platform and the communication device.

The operations may also include adjusting the pseudo random noise spreading code when at least one of the control inputs is updated. The operations may further include receiving a global positioning signal of the communication device from a global positioning device in communication with the data processing hardware, receiving an orbital location of the target platform from the target platform, determining an antenna pointing angle with respect to the target platform and associated with an antenna positioned on the communication device based on the global positioning signal of the communication device and the orbital location of the target platform, and modifying the pseudo random noise spreading code based on the antenna pointing angle. In some examples, the operations include, before modifying the communication signal, generating the communication signal. The operations may further include, before modifying the communication signal, receiving the communication signal.

Identifying the target platform may include tracking global positions of target platforms, determining a collection of target platforms and available communication channels for transmitting the communication signal at a communication time of the transmission of the modified communication signal from the phased array antenna, and selecting the target platform from the collection of target platforms. Identifying the target platform may further include querying a data source stored in memory hardware in communication with the data processing hardware for a target platform for communication with the phased array antenna and available communication channels for transmitting the communication signal at a communication time of the transmission of the modified communication signal from the phased array antenna. The phased array antenna may be disposed on a ground station or a source target platform and include antennas disposed on a micro strip and a phase shifter connected to at least one of the antennas. Establishing the communication connection between the target platform and the phased array antenna may include steering one or more array elements of the phased array antenna to move a corresponding communication beam.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 3A and 3B are perspective views of example HAPs.

Like reference symbols in the various drawings indicate like elements.

DETAILED DESCRIPTION

Figure 1A:
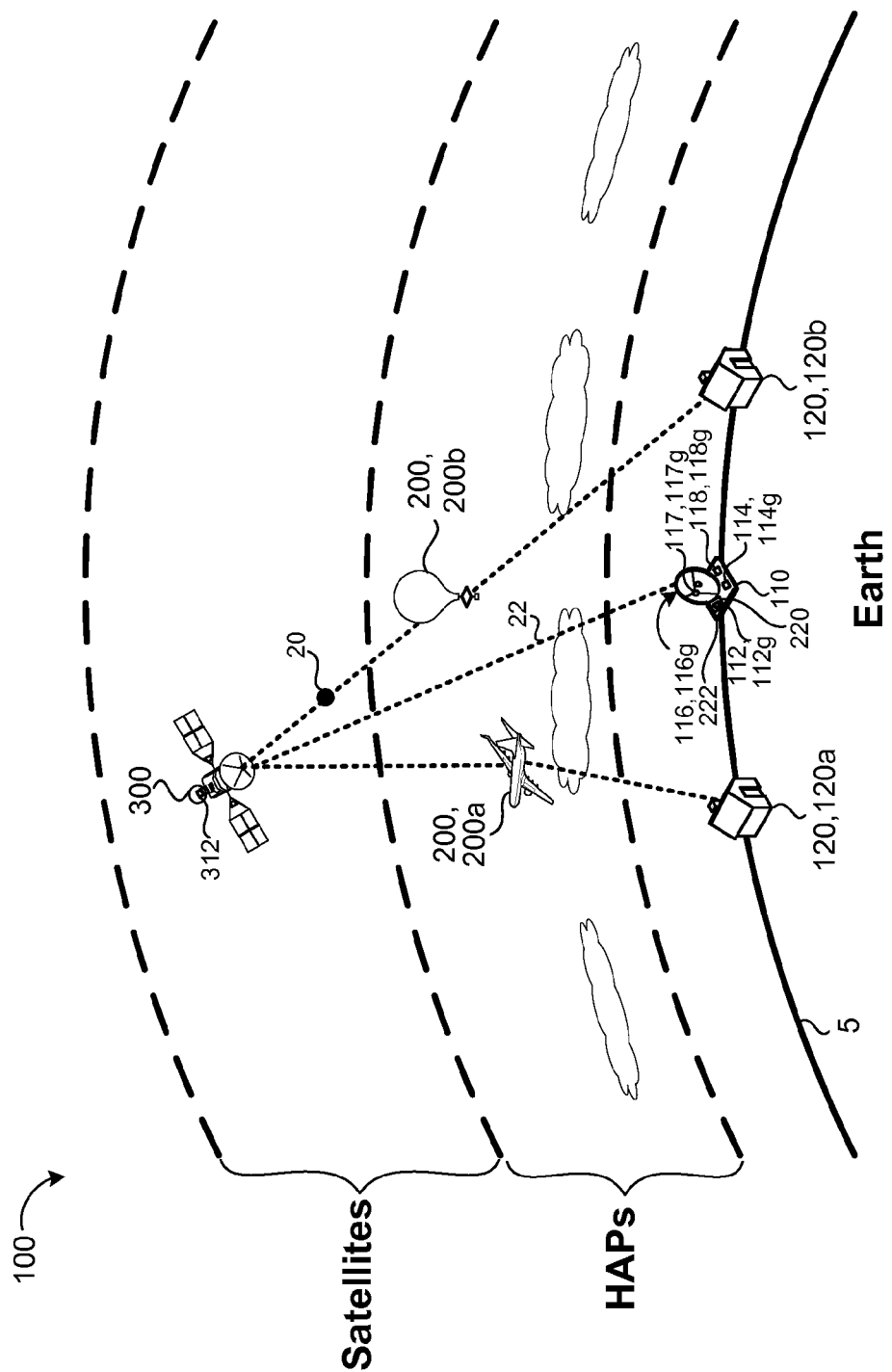
FIG. 1A is a schematic view of an exemplary communication system.

In a communication system that includes satellites and high altitude platforms (HAPs), a ground station may transmit a communication to the satellite, which in turn transmits it to the HAP. Furthermore, the HAP may send or transmit the received communication to one or more user terminals. The reverse may also occur, where the user terminal transmits a communication to the HAP, the HAP transmits the communication to the satellite, and the satellite relays the communication to the ground station. Each satellite may include one or more transponders for relaying the communication from the ground station to the HAP(s) and vice versa. A transponder has a limited number of bandwidth or channels that may be used for transmitting one or more communications. Satellite communications may include television broadcast, telephone, radio, internet, data, and military. Therefore, to transmit a smaller communication, e.g., a communication having a significantly smaller data rate than that which the transponder provides (e.g., 10 kb/second), a data processing device, such as or including a modem at the ground station or the HAP, may spread the smaller signal using direct-sequence spread spectrum (DSSS) before transmitting the communication through a phased array antenna (where the transmission of the signal is below a noise threshold). Moreover, the phased array antenna system may select a channel of the transponder that is available for use, i.e., not being used, to transmit the modified spread signal. However, if the transponder does not have any available channels, the transmitter may utilize a channel that is already transmitting a signal, since the modified spread signal does not interfere with any signals being transmitted through the transponder channels.

The ground stations, HAPs, and satellites of the communication system are moving with respect to one another. Therefore, depending on the location of a HAP or ground station with respect to a satellite, the data processing device (including the modem) associated with the HAPs and/or the ground station is capable of adapting its spreading techniques (e.g., DSSS) based on link signal levels of the satellite, which results in cost savings to the network overall. The data processing device adapts its spreading technique (e.g., a unique spreading sequence) to fit the link signal levels of the satellites. For example, when the link signal level is low, then the data processor utilizes a spreading sequence that allows the original signal to spread more than when the signal level is high. In other words, when the signal level is low, the data processing device spreads the original signal more than when the signal level is high. In addition, the data processing device dynamically adjusts the spreading of the signal based on the change of the signal level as the ground stations, HAPs, and satellites move with respect to one another.

The phased array antenna system in addition to the data processing device is able to dynamically adapt based on changed conditions received by the data processing device. The data processing device is in communication with sensors and is configured to determine measurements based on the sensors, to determine the spreading technique (e.g., a unique spreading sequence) at a certain position of the HAP or ground station with respect to the satellite. The measurements may include, but are not limited to, geolocation, antenna angles of the communication devices, link status, rain fade and others. The data processing device is configured to adjust its spreading technique (e.g., a unique spreading sequence) without relying on any centralized management system, control unit, or a HUB. In addition, the phased array antenna system adapts to the spreading technique changes automatically without being connected to the centralized management system, control unit, or HUB. Therefore, due to the phased array antenna system and the data processing device, the communication system reduces its use of power, operational costs, and overall costs.

Figure 1B:
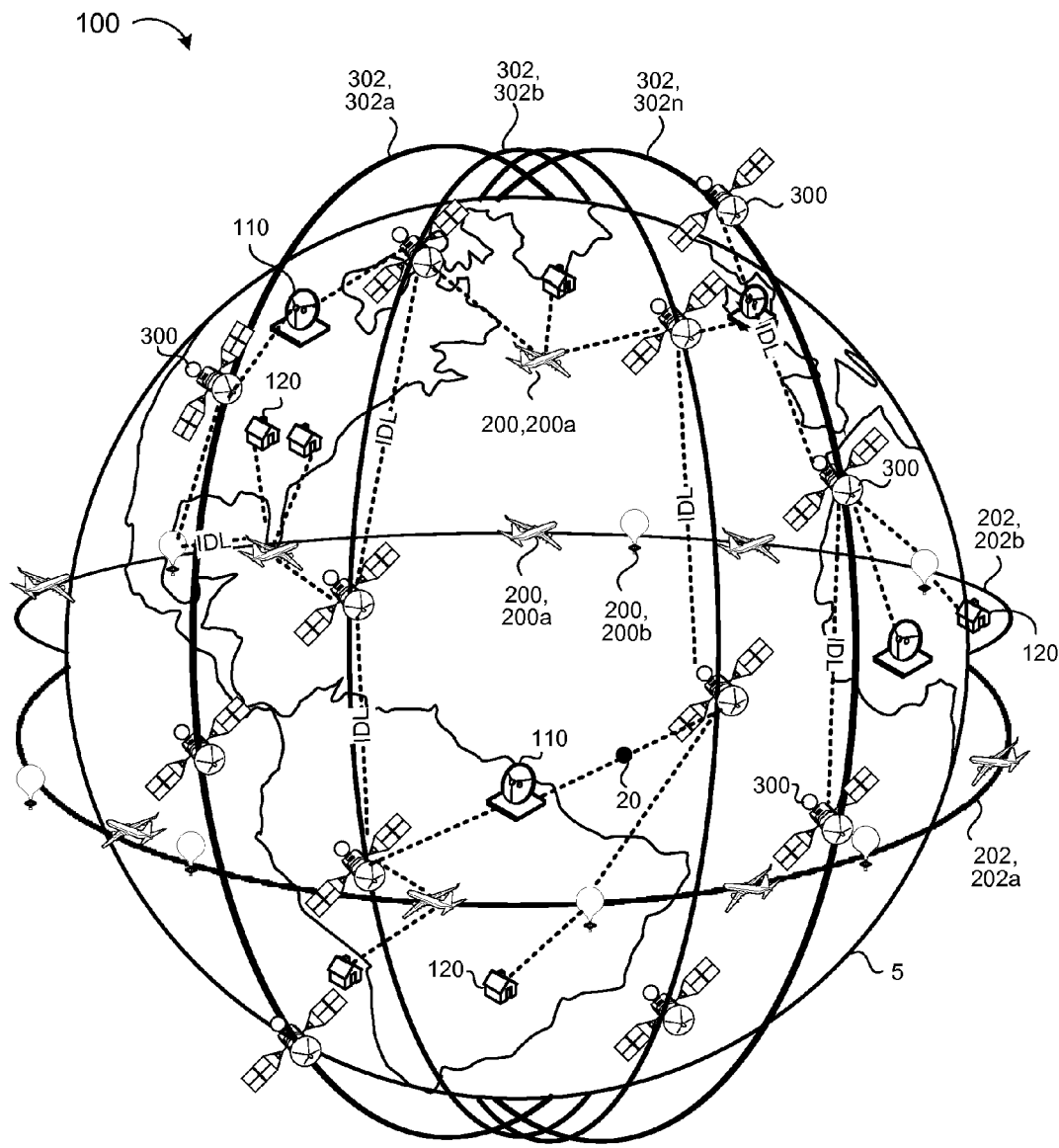
FIG. 1B is a schematic view of an exemplary global-scale communication system with satellites and high altitude platforms (HAPs), where the satellites form a polar constellation.
Figure 1C:
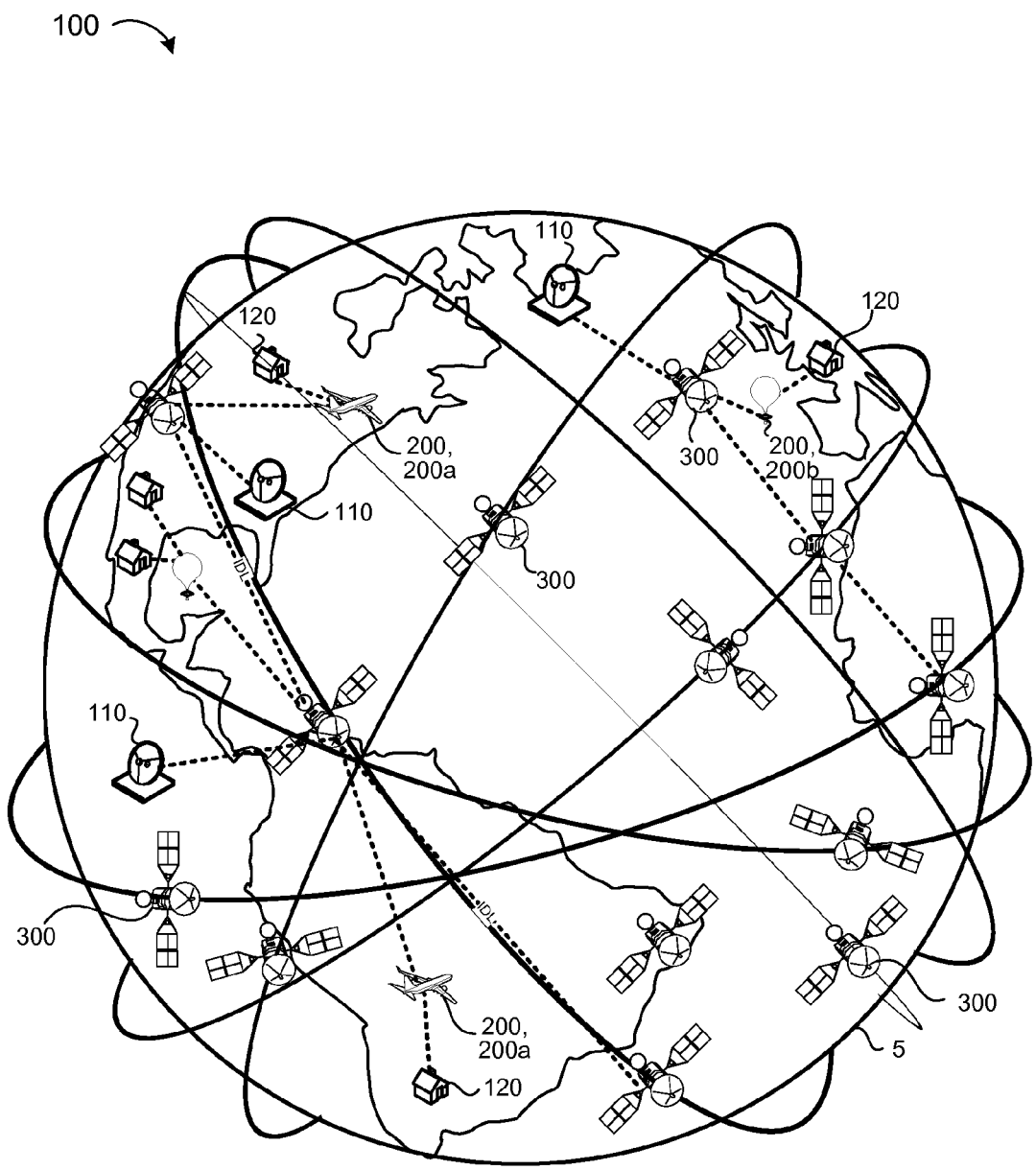
FIG. 1C is a schematic view of an exemplary group of satellites of FIG. 1A forming a Walker constellation.

Referring to FIGS. 1A-1C, in some implementations, a global-scale communication network 100 includes one or more ground stations 110, one or more terminals 120, one or more HAPs 200, and one or more satellites 300. Each ground station 110 may communicate with the one or more satellites 300, each satellite 300 may communicate with the one or more HAPs 200, and each HAP 200 may communicate with the one or more terminals 120, 120a, 120b. The ground stations 110 may be connected to one or more service providers (not shown) and the terminals 120 may be user terminals (e.g., mobile devices, residential WiFi devices, home networks, etc.). The ground station 110 may be a stationary platform, an aerial platform (e.g., drone), a terrestrial platform (e.g., car, truck, train, etc.), or an aquatic platform (e.g., boat).

In some implementations, a HAP 200 is an aerial communication device that operates at high altitudes (e.g., 17-22 kilometers). The HAP 200 may be released into the earth's atmosphere, e.g., by an air craft, or flown to the desired height. Moreover, the HAP 200 may operate as a quasi-stationary aircraft. In some examples, the HAP 200 is an aircraft 200a, such as an unmanned aerial vehicle (UAV); while in other examples, the HAP 200 is a communication balloon 200b. The satellite 300 may be in Low Earth Orbit (LEO), Medium Earth Orbit (MEO), or High Earth Orbit (HEO), including Geosynchronous Earth Orbit (GEO).

The HAPs 200 may move about the earth 5 along a path, trajectory, or orbit 202 (also referred to as a plane, since their orbit or trajectory may approximately form a geometric plane). Moreover, several HAPs 200 may operate within the same or different orbits 202. For example, some HAPs 200 may move approximately along a latitude of the earth 5 (or in a trajectory determined in part by prevailing winds) in a first orbit 202a, while other HAPs 200 may move along a different latitude or trajectory in a second orbit 202b. The HAPs 200 may be grouped amongst several different orbits 202 about the earth 5 and/or the HAPs 200 may move along other paths 202 (e.g., individual paths). Similarly, the satellites 300 may move along different orbits 302, 302a-n. Multiple satellites 300 working in concert form a satellite constellation. The satellites 300 within the satellite constellation may operate in a coordinated fashion to overlap in ground coverage. In the example shown in FIG. 1B, the satellites 300 operate in a polar constellation by having the satellites 300 orbit the poles of the earth 5; whereas, in the example shown in FIG. 1C, the satellites 300 operate in a Walker constellation, which covers areas below certain latitudes and provides a larger number of satellites 300 simultaneously in view of a ground station 110 on the ground (leading to higher availability, fewer dropped connections). In some examples, satellites 300 in GEO orbit within a plane of the Earth's equator have a radius of approximately 42,164 km or 26,199 miles measured from the center of the earth 5.

When building a global communication system 100, one of the difficulties to be considered is creating links 22 that allow a ground station 110 in the U.S. to communicate with a user terminal 120 in Japan, for example, especially when the ground station 110, HAPs 200, and satellites 300 may be moving with respect to one another. If the global communication system 100 includes HAPs 200, then the ground station 110 in the U.S. may not have a direct line-of-sight with the HAP 200 that transmits the communication 20 to the user terminal 120 in Japan. One way to achieve a link 22 from a ground station 110 that does not have a direct line-of-sight (e.g., a link 22) with a HAP 200 is to use a satellite 300 that is in the line-of-sight of both the ground station 110 and the HAP 200. Thus, the ground station 110 can transmit the communication 20 to the destination terminal 120, e.g., Japan using the satellite 300. The use of the satellite 300 requires buying or leasing bandwidth of a transponder 312 from a satellite service provider.

In some examples, the transponder 312 of a satellite gathers signals 20 from transmitters, e.g., one or more ground stations 110 or one or more user terminals 120 (via the HAPs 200), over a set of uplink frequencies and re-transmits the signals 20 on a different set of downlink frequencies to receivers, e.g., one or more ground stations 110 or one or more user terminals 120 (via the HAPs 200) on earth 5, without changing the content of the signal(s) 20. In some examples, a transponder 312 is defined by a set of satellite equipment that defines one unit of satellite capacity, usually 24 MHz or 36 MHz. Therefore, each transponder 312 of a satellite provides limited bandwidth that is divided among communication service providers (e.g., TV broadcasters, or Virtual Network Operators (VSATs), or government organizations). Communication service providers may lease one or more transponders 312 of one or more satellites 300 from the satellite service provider to broadcast their communication 20. Leasing a transponder 312 may be extremely costly due to the limited number of transponders 312 available on each satellite 300. When building a global communication network 100, the most costly consideration can be the bandwidth (i.e., channels). Due to that, the service may be extremely expensive, since there may be a limited number of channels or bandwidth that may be used. In addition, adequate and efficient use of the available bandwidth can be a factor for the financial validity and operational cost of the services of the communication network 100. Therefore, it may be desirable to build a communication network 100 that allows for a communication service provider to transmit and receive a communication 20 using the satellites 300, while maintaining a low cost of leasing bandwidth from the satellite service providers. Direct Sequence Spread Spectrum (DSSS) may be implemented as part of the global communication network 100 (e.g., modem 112) to reduce cost, power density, and secure communication, while transmitting a signal 20 globally or locally from the ground station 110 to user terminals 120 by way of the satellite 300 and/or HAPs 200. The use of DSSS allows the communication service provider to transmit a signal 20 below noise level without interfering with other signal transmissions, i.e., the transmitted signals 20 may co-exist with other signals being transmitted above the noise level. This allows for a global communication network 100 that increases the bandwidth by sending signals or communication 20 within the noise levels, which is normally not used for communications, resulting in low operational cost of the global communication network 100. In addition, the global communication network 100 may consider control inputs, such as, but not limited to, geolocation, the phased array antenna system 116 pointing angle, link status between the transmitting and receiving devices, to adjust the communication code rate and modulation (e.g., MODCOD), in addition to the method of DSSS to optimize the overall bandwidth efficiency of the communication link as the HAP 200 and ground station 110 vary in position with respect to a respective communicating satellite. Therefore, the communication network 100 assesses the operational conditions of the communication devices and implements an adaptive coding and modulation (ACM) scheme (e.g., using a processing device 220) to improve and optimize the bandwidth efficiency or mitigate fading effects of the communication signal 20. Thus, the communication network 100 considers the control inputs and adjusts its coding and modulation (i.e., DSSS spreading) based on the control inputs.

In some implementations, the ground station 110 is a terrestrial radio station configured to provide extra planetary telecommunication with the one or more satellites 300. In other implementations, the ground station 110 is moving across land, air, or water. A ground station 110 in communication with a satellite 300 establishes a link 22. In some examples, if a ground station 110 is trying to establish a link 22 with a satellite 300 that is moving with respect to the ground station 110, or the ground station 110 is moving with respect to the satellite 300, or both are moving with respect to one another, then the ground station 110 includes a phased array antenna system 116 (e.g., tracking antenna) to maintain the link 22 with the satellite 300. In other examples, when the ground station 110 is in communication with a satellite 300 having a fixed position with respect to the ground station 110, then the ground station 110 includes a phase array antenna 117 that always points to the same direction, i.e., the direction of the satellite 300 to maintain a communication link 22.

The ground station 110 may be stationary or mobile (e.g., on a boat or a moving object). In some examples, the ground station 110 includes a data processing device 220. The data processing device 220 may include a modem 112, 112g that processes a received communication 20 before sending it to the satellite 300, or processes a received communication 20 from the satellite 300.

Figure 4:
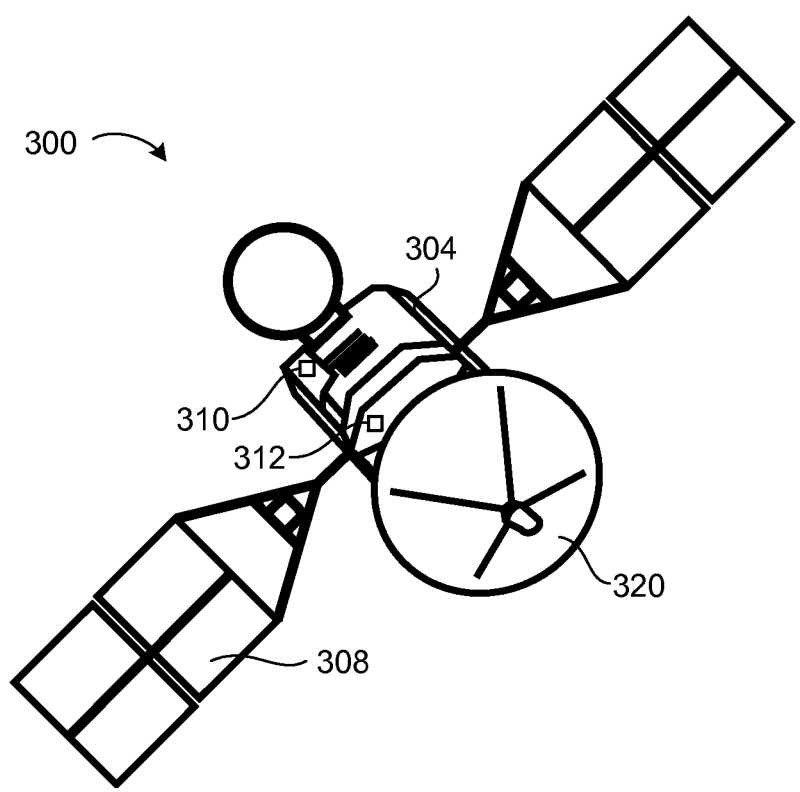
FIG. 4 is a perspective view of an example satellite.

In some implementations, the transponder 312 includes an antenna gain-to-noise-temperature (G/T) measurement and an equivalent (or effective) isotropically radiated power (EIRP) measurement. The G/T is a figure of merit (i.e., it is a quantity used to characterize the performance of a device, system, or method relative to its alternatives) in the characterization of the performance of the satellite antenna 320 (FIG. 4). G is the gain associated with the satellite antenna 320, and is measured in decibels at the receiving frequency. T is the equivalent noise temperature of the receiving system in kelvins (degrees K). Noise temperature is a way of expressing the level of available noise power introduced by a component source. Therefore, T is the summation of the noise temperature and RF chain noise temperature of the satellite antenna 320 from the satellite antenna 320 to the receivers output (e.g., ground station 110 or HAPs 200). EIRP is the amount of power that a theoretical isotropic antenna (i.e., an antenna that evenly distributes power in all directions) would emit to produce the peak power density observed in the direction of maximum antenna gain. In some examples, EIRP considers the losses in transmission line and connectors and includes the gain of the satellite antenna 320. EIRP is stated in decibels over a reference power emitted by an isotropic radiator with an equivalent signal strength. Moreover, the EIRP allows the comparison between different emitters regardless of the type, size, or form of the emitter.

As the data processing device 220 (positioned on the ground station 110 or the HAPs 200) moves from a beam peak of the transponder 312 of a satellite 300 towards the edge-of-coverage (EoC) of the satellite 300 and away from the beam peak, the G/T and the EIRP associated with the transponder 312 changes. Ground stations 110 or HAPs 200 that operate at the beam peak of the satellite 300 exhibit significantly higher G/T and EIRP associated with the transponder 312 than ground stations 110 or HAPs 200 that operate closer to EoC of a coverage area of the satellite 300. Traditionally, satellite communication systems use adaptive coding modulation (ACM) and power control to ensure that the communication link 22 between the satellite 300 and a ground station 110 or HAP 200 is maintained. ACM is a technology that automatically changes the modulation and forward error correction or FEC of a link 22 (referred to as MODCOD) to compensate for changes in the conditions of the link 22. ACM denotes the matching of the modulation, coding and other signal and protocol parameters to conditions on the communication link 22 (e.g. the pathloss, the interference to signals coming from other transmitters, the sensitivity of the receiver, the available transmitter power margin, etc.). ACM allows for the transmission of each frame using a different MODCOD, based on the reception conditions of the receiving stations. However, the use of ACM is limited by the lowest available MODCOD and applicable spectral emission limits. Therefore, it is desirable for the data processing device 220 to implement an adaptive spreading technique (in addition to the adaptive coding modulation technique) to further extend the concept of ACM as it allows for a further increase of coverage or reduction in aperture size, while preserving bandwidth efficiency in cases where less or no spreading is required.

In some examples, phased array antenna systems 116 (or satellite antennas 320) exhibit beam squint or broadening as the beam is scanned away from an antenna boresight (i.e., the axis of maximum gain of the antenna). A beam squint is the angle that the transmission is offset from the normal of the plane of the antenna. Beam squint may be caused by a signal frequency change, causing the relation of the signal to the phased array or slots to change. Beam broadening occurs when the communication 20 or beam travels away from the phased array antenna system 116 expanding in all directions. Beam broadening results in a decrease in signal strength. Beam broadening may result in spectral emission mask (SEM) violations, particularly for small aperture antennas 117 (due to the restriction of the HAP 200 weight, the aperture of the antennas 117 cannot be large in size. Also, a larger antenna 117 needs more power, which is also restricted due to the size of the HAPs 200). SEM, as defined in 3GPP TS 34.122, is a relative measurement of the out-of-channel emissions to the in-channel-power. The SEM measurement is used to measure the excess emissions that would interfere to other channels or to other systems. Phased array antenna systems 116 mounted on HAPs 200 or ground stations 110 are particularly sensitive to this effect as altitude and heading (i.e., direction) changes occur. As a result, the transmit power of the phased array antenna system 116 is reduced to comply with the mask 30 (FIGS. 2A and 2B) which effectively limits the terminal's EIRP. Besides beam broadening, the antenna gain of the phased array antenna system 116 exhibits a cosine theta dependency, which results in a main lobe gain reduction (both absolute and relative to the sidelobes). Therefore, the adaptive coding and spreading technique (implemented by the data processing device 220) is applied to the phased array antenna system 116 as a function of the scan angle to preserve constant EIRP. The main lobe or main beam of an antenna (e.g., phased array antenna systems 116) is the lobe that contains the maximum power and exhibits the greatest field strength. The radiation pattern of most antennas shows a pattern of "lobes" at various angles, directions where the radiated signal strength reaches a maximum, separated by nulls, angles at which the radiation falls to zero. In a directional antenna (such as phased array antenna systems 116) in which the objective is to emit the communication 20 in one direction, the lobe in that direction is designed to be bigger (i.e., have higher field strength) than the other lobes. The bigger lobe is commonly referred to as the main lobe. The other lobes are referred to as side lobes, and usually represent unwanted communication signals in undesired directions. A side lobe in the opposite direction from the main lobe is called the "back lobe." To preserve constant EIRP and therefore overall link quality, the transmit power must be increased, which is again limited by mask requirements. The implementation of the adaptive coding and spreading technique (implemented using a data processing device 220) is applied to the phased array antenna systems 116 as a function of scan angle to preserve a constant EIRP. The implementation of the adaptive coding and spreading technique (implemented using a processing device 220) allows the communication network 100 to operate at high bandwidth efficiency during boresight scan conditions, while spreading is increased off-boresight to allow for more total transmit power.

Several control inputs may be considered by the data processing device 220 when determining the adaptive spreading technique. In some examples, the data processing device 220 considers the geolocation of the HAP 200 or ground station 110 supporting the data processing device 220, and the G/T and EIRP of the corresponding satellite 300. The data processing device 220 may determine the geolocation of the HAP 200 or ground station 110 supporting the data processing device 220 by communicating with an inertial measurement unit (IMU) on the corresponding HAP 200 or ground station 110. An IMU is an electronic device that measures and outputs a specific force, angular rate, and sometimes a magnetic field of the HAP 200 or ground station 110, using a combination of accelerometers and gyroscopes. In some instances, devices may rely on IMUs when the device loses its GPS signal. In addition, the data processing device 220 may consider a satellite deployment database (e.g., stored on hardware memory in communication with the data processing device 220) that includes data related to each satellite, including, but not limited to, technical information about each satellite (mass, power, launch date, expected lifetime) and its orbit (apogee, perigee, inclination, and period), as well as information on what the satellite is used for, and who owns, operates, and built the satellite. The data processing device 220 considers the satellite deployment database in addition to the G/T and EIRP of the satellite 300 in communication with the corresponding HAP 200 or ground station 110 to determine the adaptation scheme. As will be discussed below, the ground station 110 or HAP 200 include the phased array antenna system 116 having a phased array antenna 117. The data processing system 220 is in communication with the phased array antenna system 116 that also includes an antenna processor 118. The phased array antenna system 116 transmits to the data processing device 220 a pointing angle of the phased array antenna 117. The data processing device 220 may determine: the pointing angle of the phased array antenna 117 from the geolocation of the satellite and/or the HAP 200 and ground station 110; the orbital location of the satellite 300; and the heading of the ground station 110 or HAP 200. When the communication link 22 is received by the ground station 110 or the HAP 200, the ground station 110 or the HAP 200 receives a received signal strength indicator (RSSI), which is a measurement of the power present in the received signal. In addition, the ground station 110 or the HAP 200 (e.g., using the data processing device 220) measures a signal-to-noise ratio (SNR), which is a measure that compares the level of a desired signal to the level of background noise. In other words, the SNR is the ratio of signal power to the noise power, expressed in decibels. A ratio higher than 1:1, i.e., greater than zero decibels, indicates more signal than noise. Therefore, the data processing device 220 considers the RSSI and/or the SNR of the link 22, when determining how to adaptively spread and code the communication 20. Therefore, the data processing device 220 considers closed loop information, such as the measurements described above, or open loop measurements, such as weather. Based on the control inputs, the ground station 110 or the HAP 200 adjusts its code rate and modulation, and its spectral spreading to optimize the bandwidth efficiency of the communication link 22.

Direct-sequence spread spectrum (DSSS) is a spread spectrum modulation technique used in telecommunications. Spread spectrum systems are configured to transmit a modified signal S3 (FIGS. 5A-6B) that contains the communication 20 using a bandwidth that is in excess of the bandwidth that the message signal S1 actually needs, which results in a wideband signal that appears as a noise signal allowing greater resistance to intentional and unintentional interference with the transmitted modified signal S3. Therefore, a phased array antenna system 116 (at the ground station 110 or HAP 200) transmits a modified signal S3, 20 below the thermal noise after receiving a data signal S1, where the modified signal S3 is transmitted below the thermal noise level of the bandwidth. When sending a modified signal S3, the modem 112, 112g multiplies a data signal S1 with a unique series S2 (also referred to as adaptive pseudo-random code) producing a noise signal, i.e., the modified signal S3. When receiving the modified signal S3, the modem 112, 112g at the receiving end regenerates the data signal S1 by multiplying the modified signal S3 with the same unique series S2.

DSSS phase-shifts a signal wave pseudo randomly with a continuous string of pseudo-noise code symbols called chips; each chip has a much shorter duration than an information bit. In other words, each information bit of the data signal S1 is modulated by a sequence S2 of much faster chips. Thus, the chip rate is much higher than the information signal bit rate. Moreover, DSSS uses a signal structure where the sequence of chips produced by the transmitter (i.e., ground station 110 or HAP 200) is known by the receiving end (i.e., ground station 110 or HAP 200). This allows for the receiving end to use the same pseudo-noise sequence S2 to counteract the effect of the pseudo-noise sequence S2 on the received modified signal S3 in order to reconstruct the information signal S2.

In some implementations, the modem 112, 112g of the ground station 110 is a DSSS modem. The modem 112, 112g (modulator-demodulator) is a device that modulates signals to encode digital information and demodulates signals to decode the transmitted information. The modem 112, 112g produces a signal that is easily transmitted and decoded to reproduce the original data. The modem 112, 112g receives a communication signal S1 from a communication service provider and generates a modified signal S3 or a communication 20 to transmit. The modem 112, 112g selects a narrow band channel and spreads the communication signal S1 by multiplying it with a pseudo random noise spreading code S2. For example, the DSSS modem 112, 112g receives the communication signal S1 and converts it to a modified signal S3 by multiplying the data signal S1 with a PN sequence S2 (pseudo-random noise spreading code), which is independent of the data signal S1; thus producing the modified signal S3 for transmission. In some examples, the PN sequence spreads the information signal S1 by a factor of 128, but there is no limit on the amount of spreading. The pseudo-random noise spreading code S2 can be implemented as forward error correction (FEC) coding, repetition coding, frequency hopping, and/or adaptive spreading. Other techniques are possible as well. Other spreading modes include, but are not limited to, spreading modes for lowering signal-to-noise ratio (SNR) to DVB-S2X (an extension of DVB-S2 satellite digital broadcasting standard) and RCS2 (for Higher Layers for Satellite (HLS) communications).

In order to retrieve the original data signal S1, a receiver modem (e.g., on a HAP 200) de-spreads the transmitted modified signal S3, i.e., multiplies the transmitted modified signal S3 with the same PN sequence S2. If a different PN sequence is used, then the modem 112, 112g at the receiving end fails to de-spread or retrieve the original data signal S1. Similarly, when the DSSS modem 112, 112g receives a modified signal S3, the DSSS modem 112, 112g multiplies the received modified signal S3 with the PN sequence S2 used at the transmitting modem. In other words, when the DSSS modem 112, 112g receives an information signal S1, it spreads the information signal S1 resulting in a modified signal S3; and when the DSSS modem 112, 112g receives a modified signal S3, the DSSS modem 112, 112g de-spreads the modified signal S3 resulting in an information signal S1. When the modem 112, 112g spreads the information signal S1, its energy is spread over a wide set of frequencies/channels, where each frequency/channel has a portion of that energy. The DSSS modem 112, 112g spreads a bandwidth $BW_{S1}$ of the information signal S1 over a much larger bandwidth $BW_{SS}$, where $BW_{SS} \gg BW_{S1}$. The SS signal spectrum is white noise-like. The amplitude and the power of the SS-signal is the same as the information signal S1.

Zero-mean White Gaussian Noise (WGN) has the same power spectral density for all frequencies. 'White' is used because white light contains equal amounts of all frequencies within the visible band of electromagnetic radiation. Pseudo-Random Noise (PN) code sequence acts like a noise-like, yet deterministic carrier used to spread the energy of a signal over a bandwidth (e.g., the bandwidth of the transponder 312). Selection of a good PN code S2 is important since the length and type of the code sets the bounds of the capability of the modem 112, 112g. In some examples, the PN code S2 is a Pseudo-Noise or Pseudo-Random sequence of 1's and 0's. However, the PN code is not a real random sequence because it is periodic. Random signals cannot be predicted. Therefore, the transmitted modified signal S3 is secure, has low power because it is spread over the channels of the transponder 312, and capable of being transmitted to any global terminal since the communication system 100 is using existing equipment 110, 200, 300.

Figure 2B:
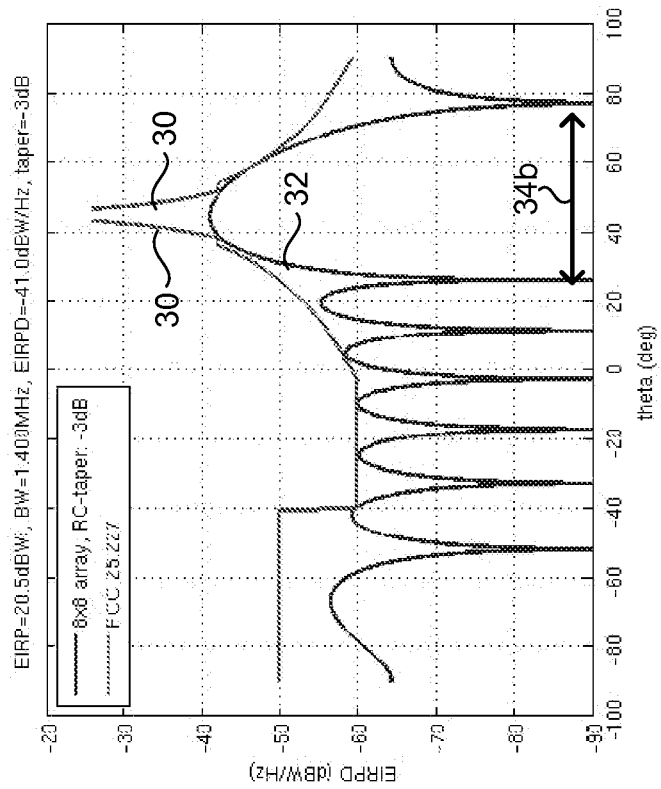
FIGS. 2A and 2B are schematic views of exemplary graphs of the adaptive spreading techniques implemented by the communication system of FIG. 1A.
Figure 2A:
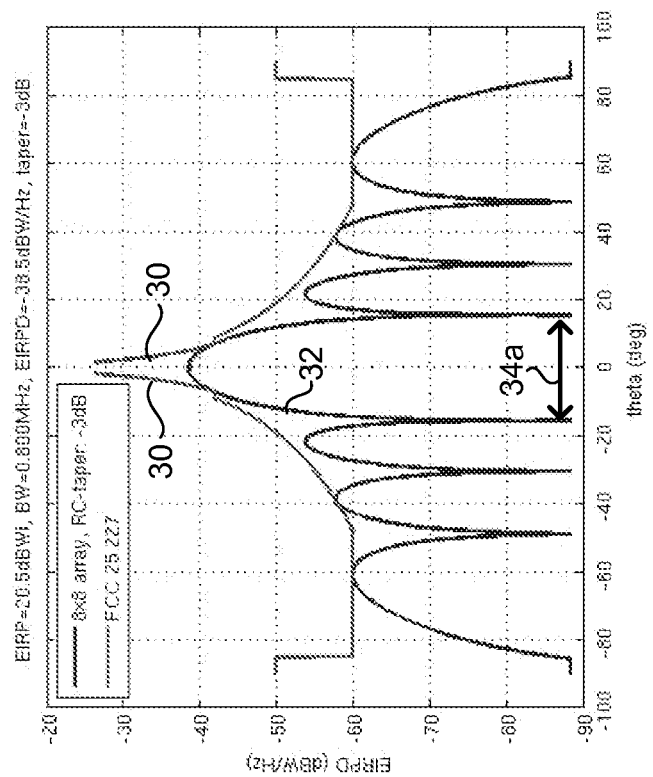

In addition to spreading the original data signal S1, the data processing device 220 adaptively adjusts the original signal S1 based on the control inputs. FIGS. 2A and 2B show how the communication system adapts its spreading spectrum based on the control inputs. The figures show two graphs that includes a case of boresight (i.e., the axis of maximum gain of the antenna) in FIG. 2A and a 45 degree angle scan in FIG. 2B. While both cases operate at an EIRP of 20.5 dBW, the graph in FIG. 2A shows that the carrier is boresight (i.e., the axis of maximum gain of the antenna is at theta equaling zero) and occupies 800 kHz, while the graph of FIG. 2B shows that the carrier occupies over 1.4 MHz (i.e., spread more than the graph of FIG. 2A) to deliver the same effective EIRP. As shown, the envelop power function 30 (also referred to as mask power) of link 22 from the satellite cannot exceed what is specified by the Federal Communications Commission (FCC, §25.227). Therefore, the data processing hardware 220 adjusts its spreading technique (i.e., the spreading sequence S2 (discussed in FIGS.>5A-6B) so that the adjusted transmitted signal S3 remains within the envelop power 30. As shown in the graph of FIG. 2A, the ground station 110 or the HAP 200 (i.e., the phased array antenna 117) is looking straight up to the satellite, i.e., they are in a direct line of sight, and the angle theta equals to zero. In this case, the signal bandwidth 34a is about 0.8 MHz. However, and as shown in FIG. 2B, when the ground station 110 or the HAP 200 is moving and reaches, for example a theta angle of about 45 degree, the signal bandwidth 34b increases to 1.4 MHz. Due to the increase in bandwidth 34b when the ground station 110 or the HAP 200 is at a theta angle greater than zero (e.g., theta is about 45 degrees) from the satellite antenna 320, the data processing hardware 220 adjusts the spreading code S2 to spread the signal 32 more than when the theta angel is closer to zero.

As previously discussed, the satellites 300 may be geo-synchronous satellites, meaning that the satellite 300 returns to the same location over the earth 5 every day, or geostationary satellite, which means that the satellite 300 appears to be at a fixed location in the sky from an observer on earth 5. When the ground station 110 is in communication with a geosynchronous satellite, the phased array antenna system 116, 116g of the ground station 110 may include a tracking device 114, 114g for tracking the moving satellites 300 orbiting the earth 5 that are within the ground station's field of view. The tracking device 114, 114g may be part of or separate from the phased array antenna system 116, 116g of the ground station 110, where the phased array antenna system 116, 116g is designed to communicate with one or more satellites 300.

In some implementations, the phased array antenna system 116, 116g includes a wideband active phased array antenna 117, 117g and data processing hardware 118, 118g. Phased array antenna systems 116, 116g provide fast beam steering, which is the ability to generate simultaneous beams and dynamically adjust the characteristics of the beam patterns. The phased array antenna 117, 117g includes a set of individual antennas that transmit and/or receives radio waves. The individual antennas are connected together in such a way that the individual current of each antenna has a specific amplitude and phase relationship, allowing the individual antennas to act as a single antenna. The relative phases of the respective signals feeding the antennas of the phased array antenna are set in a manner that an effective radiation pattern of the array is reinforced in a desired direction and suppressed in undesired directions. The phase relationships between the individual antennas may be fixed (e.g., a tower array antenna), or adjustable (e.g., beam steering antenna). In some examples, the phased array antenna 117, 117g includes antennas disposed on a micro strip and a phase shifter connected to at least one of the antennas. Moreover, the wideband active phased array antenna 117, 117g allows the transmission of the message bandwidth, which significantly exceeds the coherence bandwidth of the channel, i.e., allowing the global communication network 100 to transmit below the thermal noise level. In some examples, active phased array antennas 117, 117g incorporate transmit amplification with phase shift in each antenna element or group of elements.

The data processing hardware 118, 118g of the phased array antenna system 116, 116g may include the tracking device 114, 114g or may be in communication with the tracking device 114, 114g. The data processing hardware 118, 118g of the phased array antenna system 116, 116g is configured to identify a target HAP 200 or satellite 300 for communication with the phased array antenna 117, 117g (e.g., having a line-of-sight with the phased array antenna 117, 117g) and establish a communication connection or link 22 between the target HAP 200 or satellite 300 and the ground station 110. Moreover, the data processing hardware 118, 118g of the phased array antenna system 116, 116g is configured to identify an available communication channel for communicating data between the target HAP 200 or satellite 300 and the ground station 110. Moreover, the data processing hardware 118, 118g of the phased array antenna system 116, 116g is configured to transmit a modified communication signal (received from the modem 112, 112g) from the phased array antenna 117, 117g to the target HAP 200 or satellite 300 through the available communication channel or link 22. The modified communication signal S3 is transmitted below a thermal noise of the available communication channel. The data processing hardware 118, 118g of the phased array antenna system 116, 116g identifies the target HAP 200 or satellite 300 by tracking global positions of HAPs 200 or satellites 300 and determining a collection of HAPs 200 or satellites 300 for communication with the phased array antenna 117, 117g and available communication channels for transmitting the modified signal S3 at a communication time of the transmission of the modified signal S3 from the phased array antenna 117, 117g, and selects the target HAP 200 or satellite 300 from the collection of HAPs 200 or satellites 300. Alternatively, identifying the target HAP 200 or satellite 300 may include querying a data source (not shown) stored in memory hardware in communication with data processing hardware 118, 118g in communication with the data processing hardware of the target HAP 200 or satellite 300 that, for example, has or does not have a line-of-sight with the phased array antenna 117, 117g and available communication channels for transmitting the modified signal S3 at a communication time of the transmission of the modified communication S3 from the phased array antenna S3.

Referring to FIGS. 3A and 3B, in some implementations, the HAP 200, 200a, 200b includes an antenna 210 that receives/transmits a communication 20 from a user terminal 120. The HAP 200, 200a, 200b also includes the phased array antenna system 116, 116a, 116b and the modem 112, 112a, 112b, similar to the phased array antenna system 116g and the modem 112g discussed with respect to the ground station 110. The phased array antenna system 116, 116a, 116b allows for communication between the HAP 200 and the satellite 300. Thus the array antenna system 116a,116b includes the tracking device 114a, 114b, the phased array antenna 117,117a, 117b, and the data processing hardware 118, 118a, 118b same as the data processing hardware 118g of the ground station. In some examples, and as previously discussed, the satellite 300 and/or the HAP 200 is moving; therefore, the phased array antenna system 116, 116a, 116b of the HAP 200 needs to track a position of one or more satellites 300 to maintain a communication link 22 between the HAP 200 and the satellite 300. The satellite 300 receives a communication from one of the phased array antenna system 116, 116a, 116b, 116g of the ground station 110 or the HAP 200 and sends it back to the other one of the phased array antenna system 116, 116a, 116b, 116g of the ground station 110 or the HAP 200. The HAP 200 may include a data processing device 220 that processes the received communication 20 (i.e., the modified signal S3 or the signal received from the communication provider or user terminals) and determines a path of the communication 20 to arrive at the destination terminal 120 (e.g., user terminal). The processing device 220 may include the modem 112, 112a. In some implementations, user terminals 120 on the ground have specialized antennas that send/receive communication signals to/from the HAPs 200. The HAP 200 receiving the communication 20 from the user terminal 120 sends the communication 20 to one or more satellites 300. The HAP 200 also includes an antenna 210 for receiving and sending the communications 20 to the user terminals 120.

FIG. 3A illustrates an example aircraft 200a, such as an unmanned aerial vehicle (UAV). A UAV, also known as a drone, is an aircraft without a human pilot onboard. There are two types of UAVs, autonomous aircrafts and remotely piloted aircraft. As the name suggests, autonomous aircrafts are designed to autonomously fly, while remotely piloted aircrafts are in communication with a pilot who pilots the aircraft. In some examples, the aircraft 200a may be remotely piloted and autonomous at the same time. The UAV usually includes wings to maintain stability, a GPS system to guide it through its autonomous piloting, and a power source (e.g., internal combustion engine or electric battery) to maintain long hours of flight. In some examples, the UAV is designed to maximize efficiency and reduce drag during flight. Other UAV designs may be used as well.

FIG. 3B illustrates an example communication balloon 200b that includes a balloon 204 (e.g., sized about 49 feet in width and 39 feet in height and filled with helium or hydrogen), an equipment box 206, and solar panels 208. The equipment box 206 includes a data processing device 220 that executes algorithms to determine where the high-altitude balloon 200a needs to go, then each high-altitude balloon 200b moves into a layer of wind blowing in a direction that may take it where it should be going. The equipment box 206 also includes batteries to store power and a transceiver (e.g., antennas 210) to communicate with other devices (e.g., other HAPs 200, satellites 300, ground stations 110, user terminals 120b, internet antennas on the ground, etc.). The solar panels 208 may power the equipment box 206.

Communication balloons 200b are typically released in to the earth's stratosphere to attain an altitude between 11 to 23 miles and provide connectivity for a ground area of 25 miles in diameter at speeds comparable to terrestrial wireless data services (such as, 3G or 4G). The communication balloons 200b float in the stratosphere, at an altitude twice as high as airplanes and the weather (e.g., 20 km above the earth's surface). The high-altitude balloons 200a are carried around the earth 5 by winds and can be steered by rising or descending to an altitude with winds moving in the desired direction. Winds in the stratosphere are usually steady and move slowly at about 5 and 20 mph, and each layer of wind varies in direction and magnitude.

Referring to FIG. 4, a satellite 300 is an object placed into orbit 302 around the earth 5 and may serve different purposes, such as military or civilian observation satellites, communication satellites, navigation satellites, weather satellites, and research satellites. The orbit 302 of the satellite 300 varies depending in part on the purpose of the satellite 300. Satellite orbits 302 may be classified based on their altitude from the surface of the earth 30 as Low Earth Orbit (LEO), Medium Earth Orbit (MEO), and High Earth Orbit (HEO). LEO is a geocentric orbit (i.e., orbiting around the earth 5) that ranges in altitude from 0 to 1,240 miles. MEO is also a geocentric orbit that ranges in altitude from 1,200 mile to 22,236 miles. HEO is also a geocentric orbit and has an altitude above 22,236 miles. Geosynchronous Earth Orbit (GEO) is a special case of HEO. Geostationary Earth Orbit (GSO, although sometimes also called GEO) is a special case of Geosynchronous Earth Orbit. Satellites 300 placed in the GEO orbit can "stand still" with respect to a certain location on earth 5. Thus, a person on earth 5 looking at a satellite 300 in the GEO orbit would perceive that the satellite 300 is not moving. Therefore, the satellites 300 in GEO orbit maintain a position with respect to a location on earth 5. Thus, an antenna system 116 of a ground station 110 communicating with a satellite 300 in the GEO orbit does not need to keep tracking the satellite 300 as it moves, it only needs to point to a direction of the satellite 300 in its stationary position with respect to the ground stations 110.

In some implementations, a satellite 300 includes a satellite body 304 having a payload that includes a data processing device 310, e.g., similar to the data processing device 220 of the HAPs 200. The data processing device 310 executes algorithms to determine where the satellite 300 is heading. The satellite 300 also includes an antenna 320 for receiving and transmitting a communication 20. The satellite 300 includes solar panels 308 mounted on the satellite body 304 for providing power to the satellite 300. In some examples, the satellite 300 includes rechargeable batteries used when sunlight is not reaching and charging the solar panels 308.

In some examples, the payload of each satellite 300 includes one or more transponder(s) 312. Each transponder 312 receives a communication 20 from a ground station 110, processes, encodes, amplifies and rebroadcasts the signal over a large area of the surface of the earth 5 to one or more terminals 120. Therefore, the transponder 312 is a signal processing unit that uses a signal high-power amplification chain. Each transponder 312 handles a particular frequency range (i.e., bandwidth or channels) centered on a specific frequency. In some examples, each satellite 300 includes at least one transponder 312 (e.g., 60 transponders or more, each transponder 312 capable of transmitting up to 10 digital television signals), each transponder 312 capable of supporting one or more communication channels.

The transponder 312 may be used for broadcasting television channels. In some examples, the communication 20 received at the user terminal 120 from the transponder 312 is encoded so that only paying customers at the user terminals 120 are capable of receiving the communication 20. In some examples, one or more satellite service providers own the transponders 312 and lease bandwidth or channels of a transponder 312 to a communication service provider. The communication service provider wants to transmit/receive a communication 20 at the ground station 110 to/from user terminals 120.

In some examples, the transponder 312 gathers signals 20 from one or more ground stations 110 over a set of uplink frequencies and re-transmits the signals 20 on a different set of downlink frequencies to receivers on earth 5, without changing the content of the signal(s) 20. In some examples, a transponder 312 is defined by a set of satellite equipment that defines one unit of satellite capacity, usually 24 MHz or 36 MHz. Therefore, each transponder 312 of a satellite 300 provides limited bandwidth that is divided among communication service providers (e.g., TV broadcasters, or Virtual Network Operators (VSATs), or government organizations). Communication service providers may lease one or more transponders 312 of one or more satellites 300 from the satellite service provider to broadcast their communication 20. Leasing a transponder 312 may be extremely costly due to the limited number of transponders 312 available on each satellite 300. When building a global communication network, the most costly consideration to be made is the bandwidth (i.e., channels). Due to that, the service may be extremely expensive since there is a limited number of channels or bandwidth that may be used. Therefore, it is desirable to build a communication network 100 that allows for a communication service provider to transmit and receive a communication 20 using the satellites 300, while maintaining low cost of leasing bandwidth from the satellite service providers. Therefore, a direct spectrum modem 112 is used at the ground station 110 and the HAP 200 to reduce cost, power density, and secure communication, while transmitting a signal 20 globally or locally from/ground station 110 to user terminals 120 by way of the satellite 300 and HAPs 200.

In some implementations, the satellite 300 includes tracking, telemetry, command and ranging (TT&R) that provides a connection between the satellite 300 and facilities on the ground, e.g., the ground station 110 or the HAPs. The TT&R ensures that the satellite 300 establishes communication or a link 22 to successfully receive/transmit a communication 20. The TT&R performs several operations, including, but not limited to, monitoring the health and status of the satellite 300 by way of collecting, processing, and transmitting data from the one source (e.g., the ground station 110) to the destination (e.g., HAP 200) or vice versa, passing through the satellite 300. Another operation includes determining the satellite's exact location by way of receiving, processing, and transmitting of communications 20. Yet another operation of the TT&R includes properly controlling the satellite 300 through the receiving, processing, and implementing of commands transmitted from the ground stations 110. In some examples, a ground operator controls the satellite 300; however, such an intervention by the operator is only minimal or in case of an emergency and the satellite 300 is mostly autonomous.

In some examples, the satellite 300 includes batteries to operate the satellite 300 when the solar panels 208 of the satellite 300 are hidden from the sun due to the earth 5, the moon, or any other objects. In some examples, the satellite 300 also includes a reaction control system (RCS) that uses thrusters to adjust the altitude and translation of the satellite 300 making sure that the satellite 300 stays in its orbit 202. The RCS may provide small amounts of thrusts in one or more directions and torque to allow control of the rotation of the satellite 300 (i.e., roll, pitch, and yaw).

Referring back to FIG. 1A, in some implementations, when constructing a global-scale communications network 100 using HAPs and satellites 300, a 'bent pipe' architecture is used. The bent pipe architecture, shown in FIG. 1A, is where the satellite 300 receives a communication 20 from the ground station 110 and sends it to the user terminal 120, in this case through the HAP 200. Another example is where the satellite 300 receives a communication 20 from the terminal 120 through the HAP 200 and sends it to the ground station 110. The satellite 300 receives the communication 20 and sends it to its destination, acting like a bent pipe. In this case, the satellite 300 acts as a repeater and no satellite 300 to satellite 300 communication occurs, i.e., the satellite 300 does not transfer the communication 20 to another satellite 300 before transmitting it to its destination.

Referring back to FIG. 1B, in some implementations, it is sometimes desirable to route traffic over long distances through the global communication network 100 by linking HAPs 200 to satellites 300 and/or one HAP 200 to another. For example, two satellites 300 may communicate via inter-device links and two HAPs 200 may communicate via inter-device links. Inter-device link (IDL) eliminates or reduces the number of HAP 200 or satellite 300 ground station 110 hops, which decreases the latency and increases the overall network capabilities. Inter-device links allow for communication traffic from one HAP 200 or satellite 300 covering a particular region to be seamlessly handed over to another HAP 200 or satellite 300 covering the same region, where a first HAP 200 or satellite 300 is leaving the first area and a second HAP 200 or satellite 300 is entering the area. Such inter-device linking is useful to provide communication services to areas far from the ground stations 110 and the terminals 120 and may also reduce latency and enhance security (fiber optic cables 12 may be intercepted and data going through the cable may be retrieved). Therefore, when using IDL, the first device in the transmission chain (e.g., modulates the communication signal S1, i.e., multiplies it by the sequence S2), and the last device in the transmission chain (e.g., HAP 200 that receives the modified signal S3) de-spreads the modified signal S3 before transmitting the communication data S1 to the user terminals 120.

The use of the IDL model is different than the "bent-pipe" model, in which all signal traffic goes from a source ground station 110 to a satellite 300, and then directly down to a destination, e.g., user terminal 120 or vice versa. The "bent-pipe" model does not include any inter-device communications. Instead, the satellite 300 acts as a repeater. In some examples of "bent-pipe" models, the signal received by the satellite 300 is amplified before it is re-transmitted; however, no signal processing occurs. In other examples of the "bent-pipe" model, part or all of the signal may be processed and decoded to allow for one or more of routing to different beams, error correction, or quality-of-service control; however no inter-device communication occurs.

In some implementations, large-scale communication constellations 100 are described in terms of a number of orbits 202, 302, and the number of HAPs 200 or satellites 300 per orbit 202, 302. HAPs 200 or satellites 300 within the same orbit 202, 302 maintain the same position relative to their intra-orbit HAP 200 or satellite 300 neighbors. However, the position of a HAP 200 or a satellite 300 relative to neighbors in an adjacent orbit 202, 302 may vary over time. For example, in a large-scale satellite constellation with near-polar orbits, satellites 300 within the same orbit 202 (which corresponds roughly to a specific latitude, at a given point in time) maintain a roughly constant position relative to their intra-orbit neighbors (i.e., a forward and a rearward satellite 300), but their position relative to neighbors in an adjacent orbit 302 varies over time. A similar concept applies to the HAPs 200; however, the HAPs 200 move about the earth 5 along a latitudinal plane and maintain roughly a constant position to a neighboring HAP 200.

One of the advantages of using a DSSS modem 112 to spread a communication signal S1 before transmission, is that the ground station 110 or the HAP 200 do not need a large antenna 117, which leads to a reduction in the power consumption by the antenna 117, a reduction of the dimensions of the antenna 117 and weight of the payload of the ground station 110 and the HAP 200, a more simplified mechanical design of the ground station 110 and the HAP 200.

As previously described, a communication service provider may lease channels for transmitting signals via a transponder. The bandwidth available for leasing may be 36 Mhz or 24 Mhz. However, the communication service provider may only need a relatively smaller bandwidth to transmit his/her communication 20, (e.g., 10 kbs). In such a case, leasing 36 Mhz or 24 Mhz may be very expensive since only 10 kbs are needed, thus it is wasteful to lease a transponder 312 that provides 36 Mhz or 24 Mhz to only use a small fraction of the available bandwidth. At any given time, on a satellite system 300, not all of the transponders 312 are being used. For each transponder 312, a fraction of its available channels may be in use at a given time. In addition, such use of the channels of each transponder 312 may vary at any given time. In order to save operational costs, a system that utilizes DSSS modems 112 and transmits below the noise level of the channels being used, and capable of hopping to an unused channel when necessary allows for a signal to be transmitted in the noise range along with other signals without causing interference between the signals.

In such a case, the communication service provider and the satellite service provider may agree that the communication service provider send the noise signal by way of the transponder 312 on the satellite, without leasing an entire bandwidth of the transponder 312 and only leasing the needed bandwidth. This significantly reduces the operational cost of sending a communication 20 that is relatively smaller than the available bandwidth of a transponder 312, without having to lease the entire bandwidth of the transponder 312.

Moreover, and to increase the chances of preventing interference, the phased antenna system 116 may determine which channels are available and frequency hop the noise signal to an available channel, by moving the center of the noise signal to any available unused channels, which further minimizes interference.

The algorithms used to determine the path of a communication 20 (e.g., at the data processing device 220) may include a scoring function for assigning a score or weight value to each link (communication between the ground station 110, the HAPs 200, and/or the satellites 300). These scores are considered in the algorithms used. For example, the algorithm may try to minimize the cumulative weight of the path (i.e., sum of the weights of all the links that make up the path). In some implementations, a system data processor considers the physical distance (and, closely related, latency) between the ground station 110, the HAPs 200, and/or the satellites 300, the current link load compared to the capacity of the link between the ground station 110, the HAPs 200, and/or the satellites 300, the health of the ground station 110, the HAPs 200, and/or the satellites 300, or its operational status (active or inactive, where active indicates that the device is operational and healthy and inactive where the device is not operational); the battery of the ground station 110, the HAPs 200, and/or the satellites 300 (e.g., how long will the device have power); and the signal strength at the user terminal (for user terminal-to-satellite link).

Figure 5A:
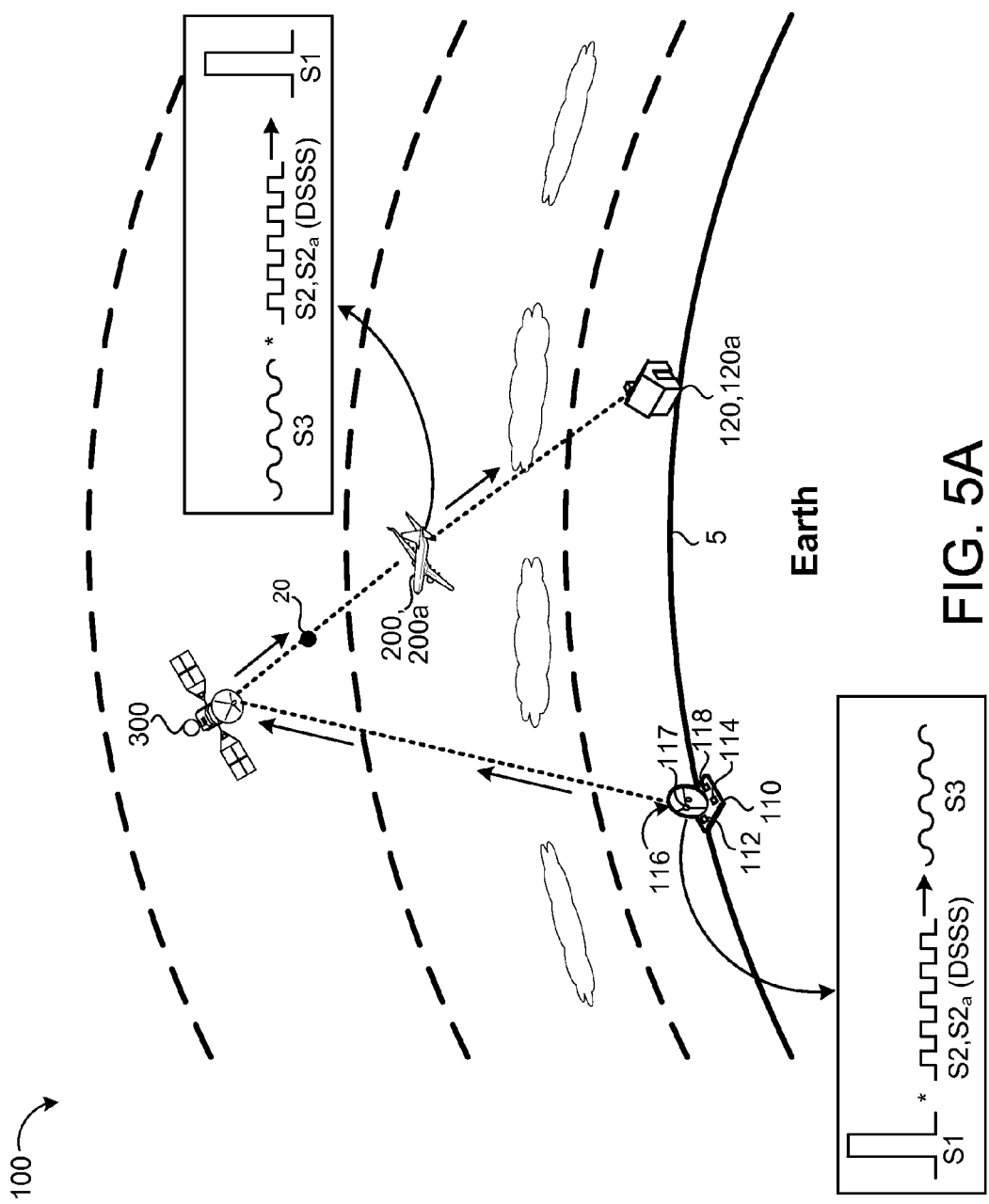
FIGS. 5A and 5B are schematic views of an exemplary path between HAPs for sending a communication between a first user and a second user in a global-scale communication system.

FIGS. 5A-7, illustrate an arrangement of operations for communicating between a source and a destination. FIGS. 5A and 5B show a source as the ground station 110 and the destination being the user terminal 120, where the communication 20 travels from the ground station 110 to the satellite 300 to the HAP 200, and finally to the user terminal 120. FIG. 5A shows an instance where the HAP 200 is within the boresight of the satellite 300 (see also FIG. 2A), however in FIG. 5B, the HAP 200 moved from its location in FIG. 5A and is at an angle theta from the boresight of the satellite 300 (see also FIG. 2B). Thus, the data processing device 220 of the ground station 110 adjusts the adaptive pseudo-random code $S2_a$ used in FIG. 5A, and applies a different adaptive pseudo-random code $S2_b$. As previously explained, the adaptive coding and spreading technique is applied due to control inputs (described above).

Figure 5B:
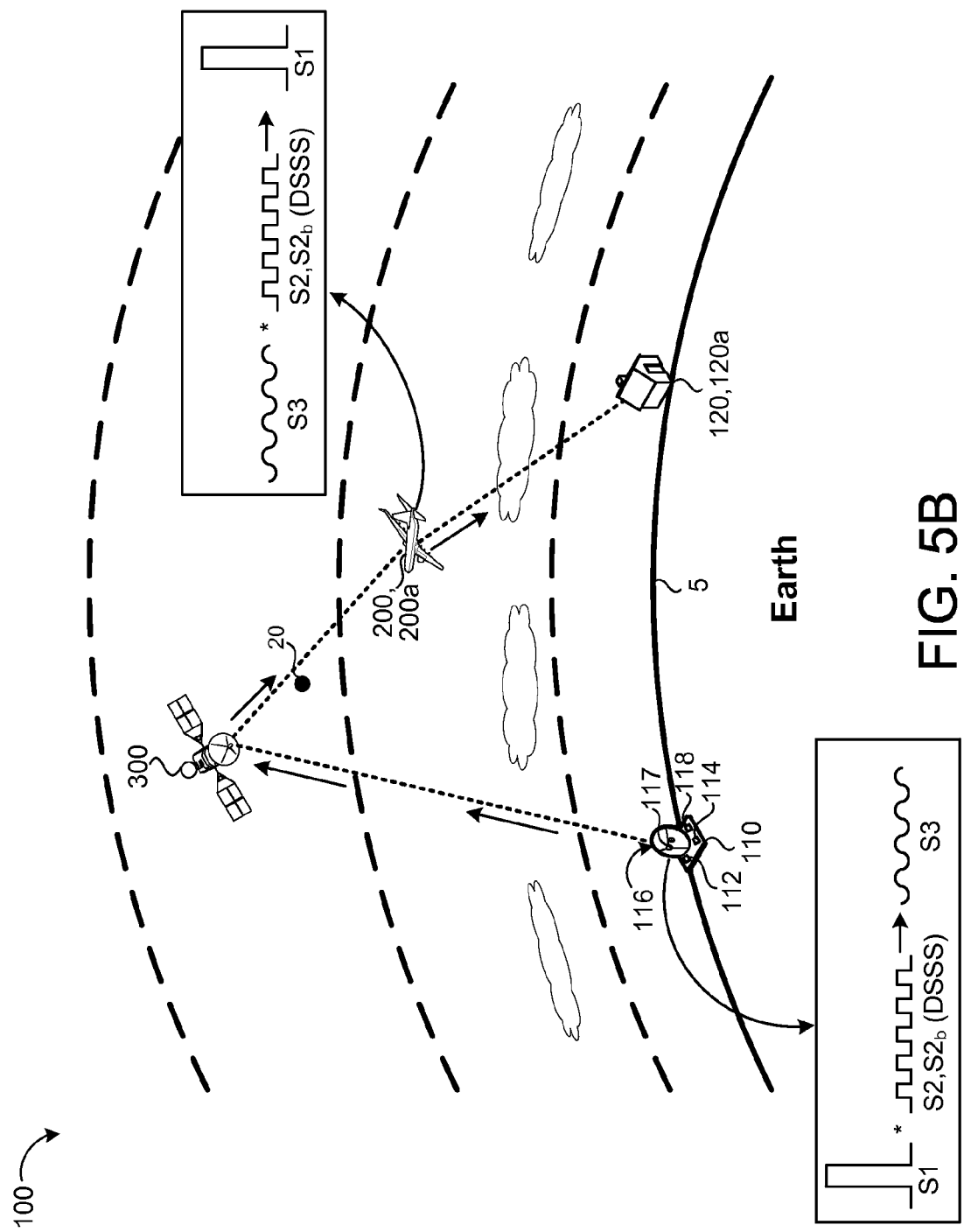
Figure 6A:
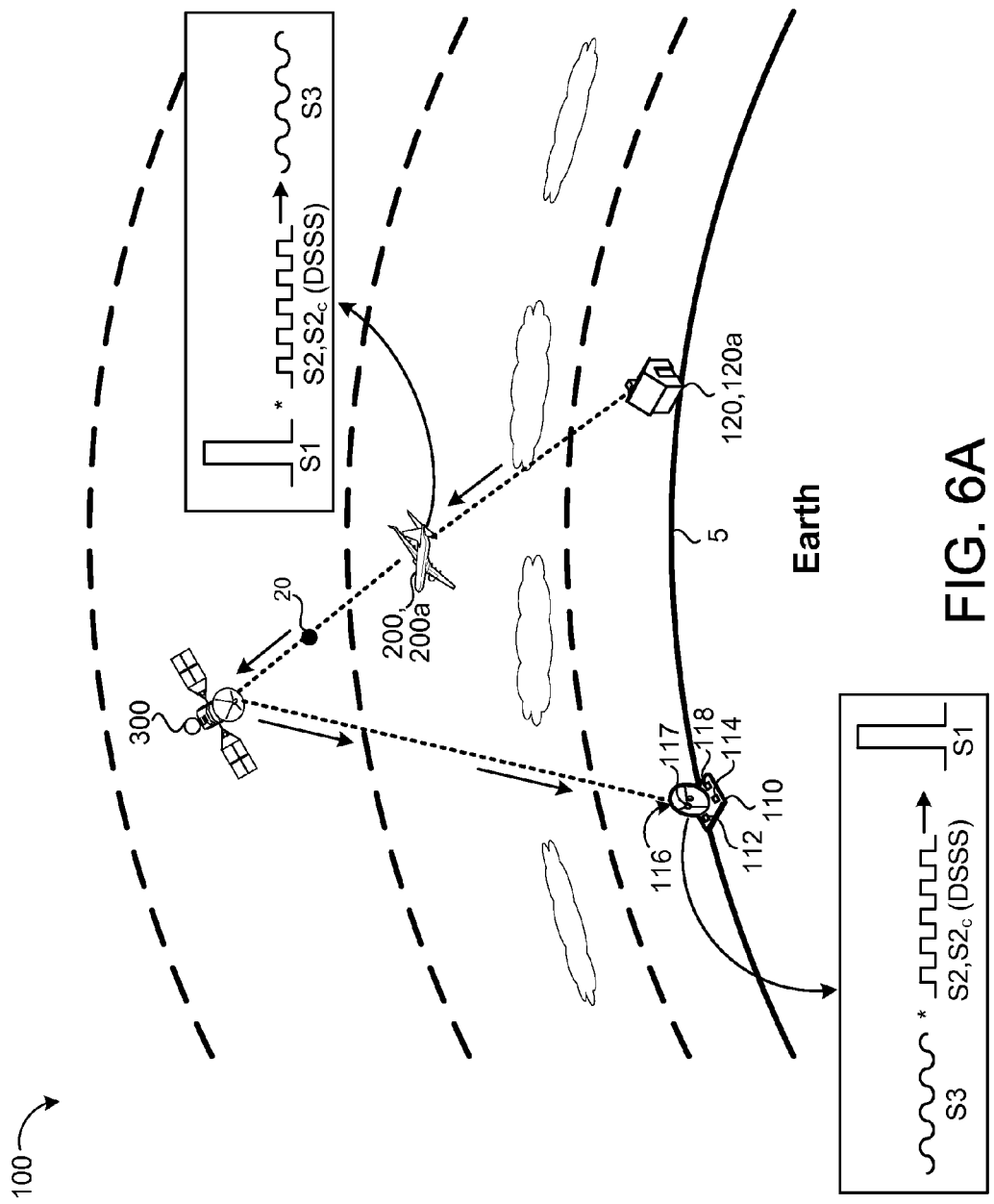
FIGS. 6A and 6B are schematic views of an exemplary path between HAPs for sending a communication between a first user and a second user in a global-scale communication system.
Figure 6B:
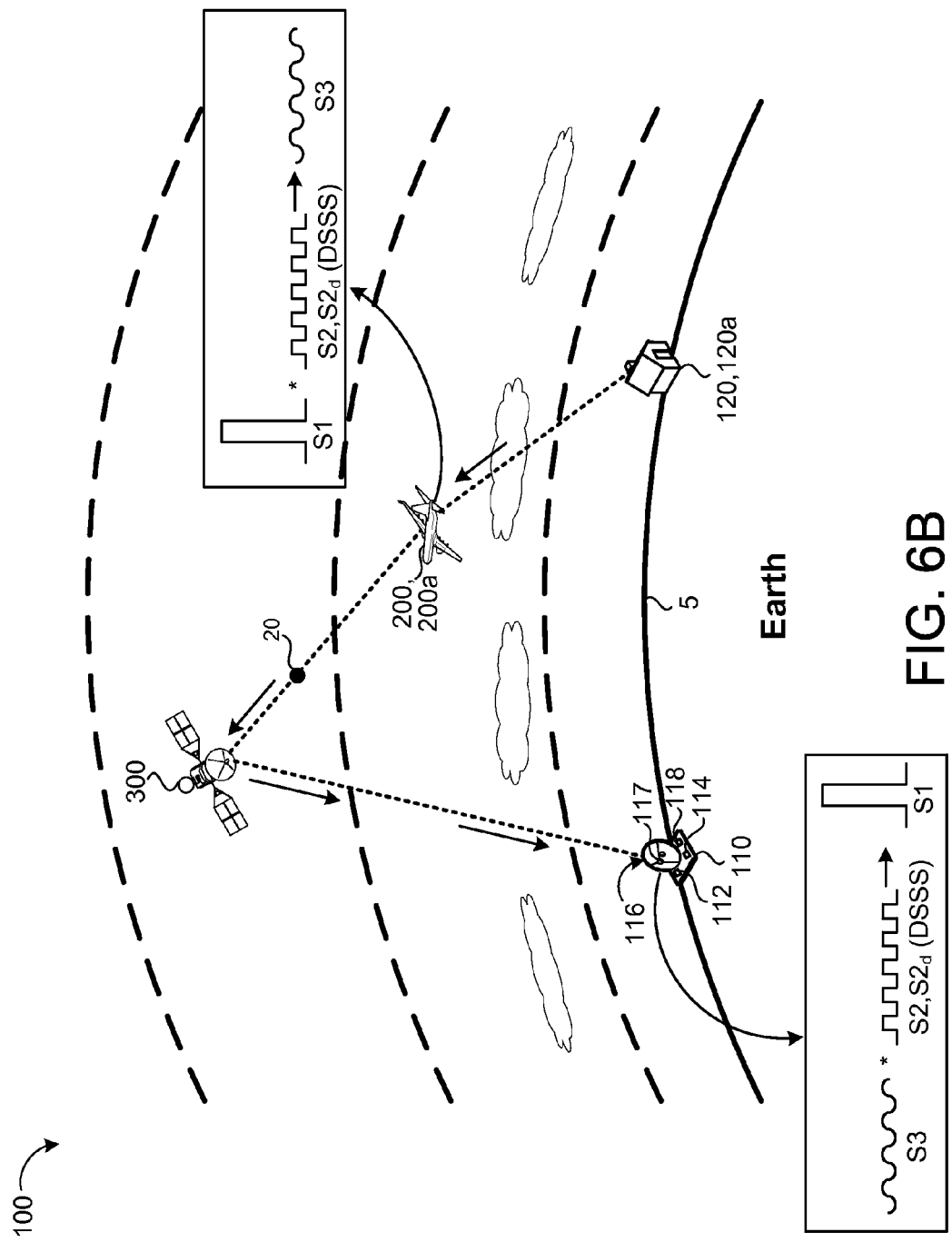

FIGS. 6A and 6B shows the same elements of FIGS. 5A and 5B; however, in FIGS. 6A and 6B the source of the communication 20 is the user terminal 120, which travels to the HAP 200, then the satellite 300, before reaching the destination ground station 110. FIG. 6A shows and instance (similar to FIG. 5A) where the HAP 200 is within the boresight of the satellite 300, however in FIG. 6B, the HAP 200 moved from its location in FIG. 6A and is at an angle theta from the boresight of the satellite 300. Thus the data processing device 220 of HAP 200 adjusts the adaptive pseudo-random code $S2_c$ used in FIG. 6A, and applies a different adaptive pseudo-random code $S2_d$. In some examples, the communication 20 of FIGS. 5A and 6A, and 5B and 6B occur simultaneously, since both the ground station 110 and the HAP 200 include a modem 112 that applies an adaptive pseudo-random code S2, and an antenna system 116 that includes a phased array antenna 117 and data processing hardware 118. In some examples, data processing hardware 118 also refers to the tracking device 114 or the modem 112. The adaptive pseudo-random code S2 can be implemented as forward error correction (FEC) coding, repetition coding, frequency hopping, and/or adaptive spreading. Other techniques are possible as well.

Figure 7:
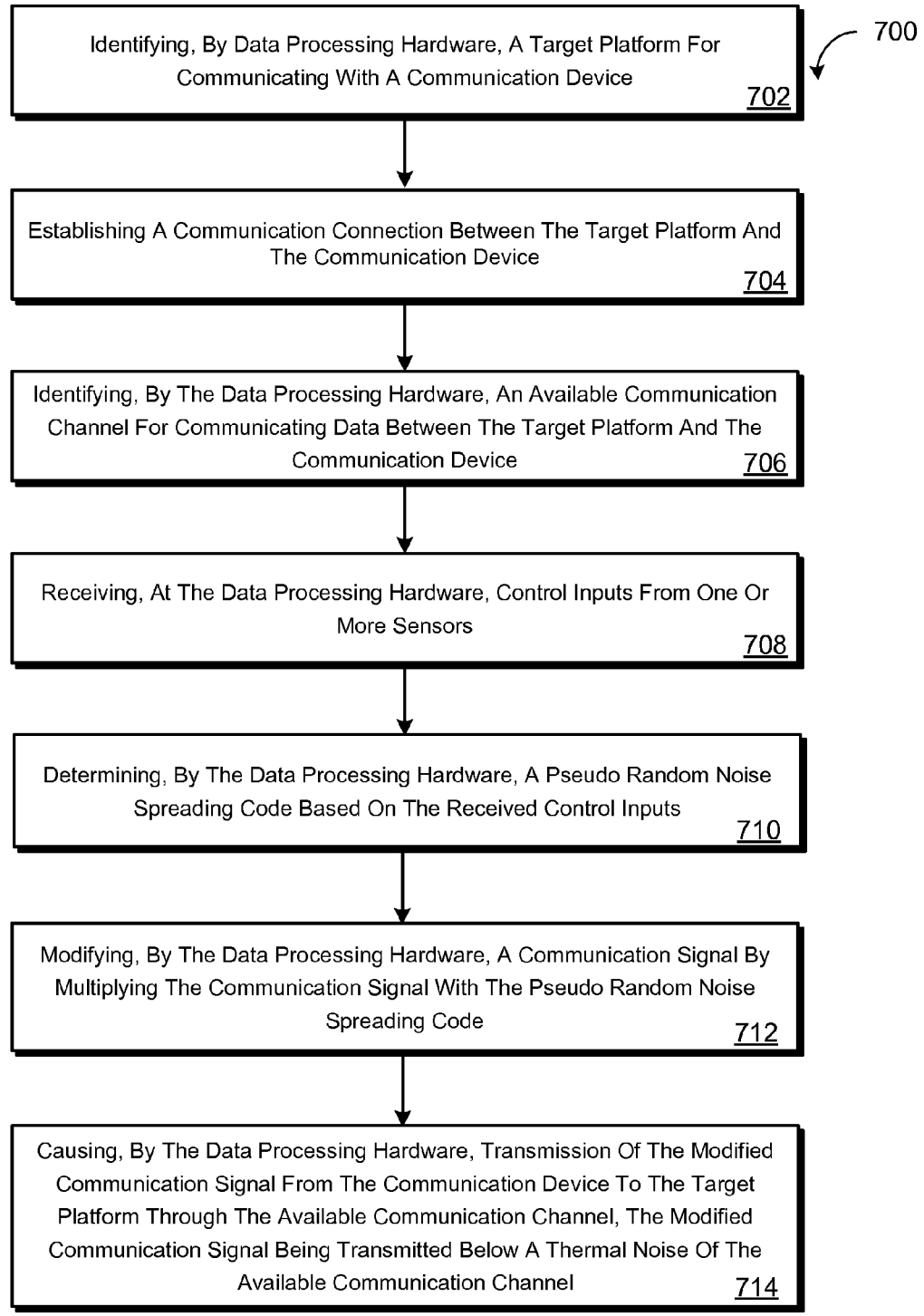
FIG. 7 is a schematic view of an exemplary arrangement of operations for communicating between a source and a destination.

FIG. 7 illustrates a method 700 for modifying a communication signal S1 for transmission from a source or a communication device (e.g., ground station 110 or HAP 200) to a target platform (e.g., a satellite 300) based on the system described in FIGS. 1A-6B. At block 702, the method 700 includes identifying, by data processing hardware 220, a target platform for communicating with a communication device 110, 200. At block 704, the method 700 includes establishing a communication connection (e.g., a link 22) between the target platform 300 and the communication device 110, 200. At block 706, the method 700 also includes identifying, by the data processing hardware 220, an available communication channel for communicating data (e.g., a communication 20) between the target platform 300 and the communication device 110, 200. At block 708, the method 700 includes receiving, at the data processing hardware 220, control inputs from one or more sensors 222. At block 710, the method 700 further includes determining, by the data processing hardware 220, a pseudo random noise spreading code S2 based on the received control inputs. At block 712, the method 700 includes modifying, by the data processing hardware 220, a communication signal S1 by multiplying the communication signal S1 with the pseudo random noise spreading code S2. At block 714, the method 700 includes causing, by the data processing hardware 220, transmission of the modified communication signal S3 from the communication device 110, 200 to the target platform 300 through the available communication channel 22. The modified communication signal is transmitted below a thermal noise of the available communication channel.

In some implementations, the control inputs include at least one of a geolocation, an antenna gain-to-noise-temperature associated with the target platform 300, an equivalent isotropically radiated power associated with the target platform 300, an antenna pointing angle associated with the communication device 110, 200, a received signal strength indicator of the target platform 300, or a signal-to-noise ratio of a communication between the target platform 300 and the communication device 110, 200. The method 700 may also include adjusting, by the data processing hardware 220, the pseudo random noise spreading code S2 when at least one of the control inputs is updated.

In some examples, the method 700 includes receiving, at the data processing hardware 220, a global positioning signal of the communication device 110, 200 from a global positioning device in communication with the data processing hardware 220 and receiving, at the data processing hardware 220, an orbital location of the target platform 300 from the target platform 300. The method 700 may also include determining, by the data processing hardware 220, an antenna pointing angle with respect to the target platform 300 and associated with an antenna positioned on the communication device based on the global positioning signal of the communication device 110, 200 and the orbital location of the target platform 300 and modifying, by the data processing hardware 220, the pseudo random noise spreading code S2 based on the antenna pointing angle. Before modifying the communication signal, the method 700 may include generating, by the data processing hardware 220, the communication signal. Before modifying the communication signal, the method 700 may also include receiving, at the data processing hardware 220, the communication signal.

In some examples, identifying the target platform 300 includes tracking, by the data processing hardware 220, global positions of target platforms, determining, by the data processing hardware 220, a collection of target platforms and available communication channels for transmitting the communication signal at a communication time of the transmission of the modified communication signal from the communication device 110, 200, and selecting, by the data processing hardware 220, the target platform 300 from the collection of target platforms. Identifying the target platform 300 may also include querying a data source stored in memory hardware in communication with the data processing hardware 220 for a target platform 300 for communication with the communication device 110, 200 and available communication channels for transmitting the communication signal at a communication time of the transmission of the modified communication signal from the communication device 110, 200.

The communication device 110, 200 may include a phased array antenna 116. Establishing the communication connection 22 between the target platform 300 and the communication device 110, 200 includes steering one or more array elements of the phased array antenna 116 to move a corresponding communication beam. A ground station or a source target platform 300 may include the data processing hardware 220.

Figure 8:
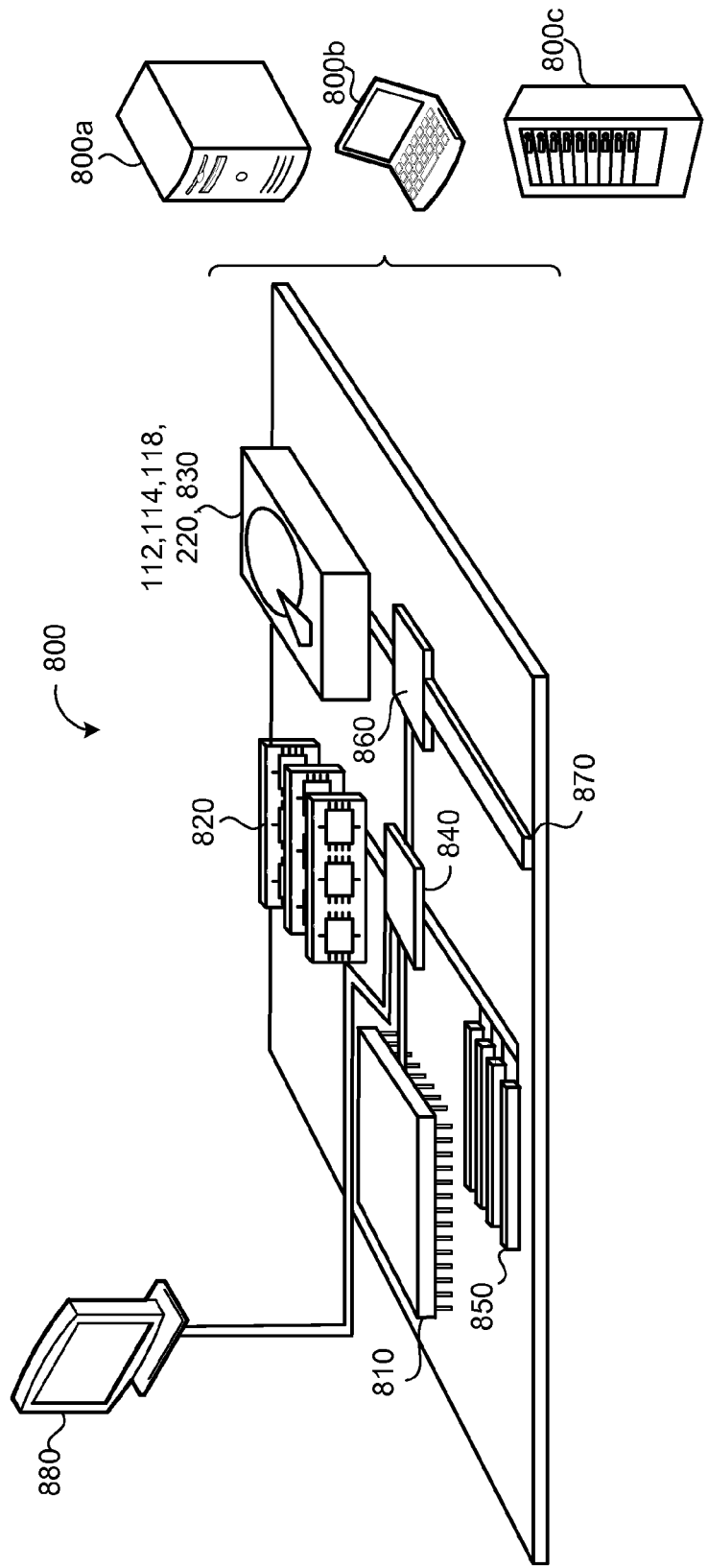
FIG. 8 is a schematic view of an example computing device executing any systems or methods described herein.

FIG. 8 is a schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810, memory 820, a storage device 830, a high-speed interface/controller 840 connecting to the memory 820 and high-speed expansion ports 850, and a low speed interface/controller 860 connecting to low speed bus 870 and storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and low-speed expansion port 870. The low-speed expansion port 870, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 800 may be implemented in a number of different forms, as shown in the figure. For example, it may be implemented as a standard server 800*a* or multiple times in a group of such servers 800*a*, as a laptop computer 800*b*, or as part of a rack server system 800*c*.

Various implementations of the systems and techniques described here can be realized in digital electronic circuitry, integrated circuitry, specially designed ASICs (application specific integrated circuits), FPGAs (field-programmable gate arrays), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit), or an ASIC specially designed to withstand the high radiation environment of space (known as "radiation hardened", or "rad-hard").

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
   identifying, by data processing hardware, a target platform for communicating with a communication device;
   establishing a communication connection between the target platform and the communication device;
   identifying, by the data processing hardware, an available communication channel for communicating data between the target platform and the communication device;
   receiving, at the data processing hardware, control inputs from one or more sensors;
   determining, by the data processing hardware, a pseudo random noise spreading code based on the received control inputs;
   modifying, by the data processing hardware, a communication signal by multiplying the communication signal with the pseudo random noise spreading code;
   causing, by the data processing hardware, transmission of the modified communication signal from the communication device to the target platform through the available communication channel, the modified communication signal being transmitted below a thermal noise of the available communication channel;
   receiving, at the data processing hardware, a global positioning signal of the communication device from a global positioning device in communication with the data processing hardware;
   receiving, at the data processing hardware, an orbital location of the target platform from the target platform;
   determining, by the data processing hardware, an antenna pointing angle with respect to the target platform and associated with an antenna positioned on the communication device based on the global positioning signal of the communication device and the orbital location of the target platform; and
   modifying, by the data processing hardware, the pseudo random noise spreading code based on the antenna pointing angle.

2. The method of claim 1, wherein the control inputs include at least one of a geolocation, an antenna gain-to-noise-temperature associated with the target platform, an equivalent isotropically radiated power associated with the target platform, an antenna pointing angle associated with the communication device, a received signal strength indicator of the target platform, or a signal-to-noise ratio of a communication between the target platform and the communication device.

3. The method of claim 2, further comprising adjusting, by the data processing hardware, the pseudo random noise spreading code when at least one of the control inputs is updated.

4. The method of claim 1, wherein the communication device comprises a phased array antenna, and wherein establishing the communication connection between the target platform and the communication device comprises steering one or more array elements of the phased array antenna to move a corresponding communication beam.

5. The method of claim 1, further comprising, before modifying the communication signal, generating, by the data processing hardware, the communication signal.

6. The method of claim 1, further comprising, before modifying the communication signal, receiving, at the data processing hardware, the communication signal.

7. The method of claim 1, wherein a ground station or a source high altitude platform comprises the data processing hardware.

8. The method of claim 1, wherein identifying the target platform comprises querying a data source stored in memory hardware in communication with the data processing hardware for a high altitude platform for communication with the communication device and available communication channels for transmitting the communication signal at a communication time of the transmission of the modified communication signal from the communication device.

9. A method comprising:
   identifying, by data processing hardware, a target platform for communicating with a communication device;
   establishing a communication connection between the target platform and the communication device;
   identifying, by the data processing hardware, an available communication channel for communicating data between the target platform and the communication device;
   receiving, at the data processing hardware, control inputs from one or more sensors;
   determining, by the data processing hardware, a pseudo random noise spreading code based on the received control inputs;
   modifying, by the data processing hardware, a communication signal by multiplying the communication signal with the pseudo random noise spreading code; and
   causing, by the data processing hardware, transmission of the modified communication signal from the communication device to the target platform through the available communication channel, the modified communication signal being transmitted below a thermal noise of the available communication channel,
   wherein identifying the target platform comprises:
      tracking, by the data processing hardware, global positions of target platforms
      determining, by the data processing hardware, a collection of the target platforms and available communication channels for transmitting the communication signal at a communication time of the transmission of the modified communication signal from the communication device; and
      selecting, by the data processing hardware, the target platform from the collection of target platforms.

10. A communication system comprising:
    a signal spreading device configured to:
       receive a communication signal;
       receive one or more control inputs from one or more sensory devices;
       determine a pseudo random noise spreading code based on the one or more control inputs; and
       modify the communication signal by multiplying the communication signal with the pseudo random noise spreading code; and a phased array antenna system in communication with the signal spreading device, the phased array antenna system comprising:
a phased array antenna; and
data processing hardware configured to perform operations comprising:
identifying a target platform for communicating with the phased array antenna;
establishing a communication connection between the target platform and the communication system;
identifying an available communication channel for communicating data between the target platform and the communication system; and
transmitting the modified communication signal from the phased array antenna to the target platform through the available communication channel, the modified communication signal being transmitted below a thermal noise of the available communication channel,
wherein identifying the target platform comprises:
tracking global positions of target platforms;
determining a collection of target platforms and available communication channels for transmitting the communication signal at a communication time of the transmission of the modified communication signal from the phased array antenna; and
selecting the target platform from the collection of target platforms.

11. A communication system comprising:
a signal spreading device configured to:
receive a communication signal;
receive one or more control inputs from one or more sensory devices;
determine a pseudo random noise spreading code based on the one or more control inputs; and
modify the communication signal by multiplying the communication signal with the pseudo random noise spreading code; and
a phased array antenna system in communication with the signal spreading device, the phased array antenna system comprising:
a phased array antenna; and
data processing hardware configured to perform operations comprising:
identifying a target platform for communicating with the phased array antenna;
establishing a communication connection between the target platform and the communication system;
identifying an available communication channel for communicating data between the target platform and the communication system;
transmitting the modified communication signal from the phased array antenna to the target platform through the available communication channel, the modified communication signal being transmitted below a thermal noise of the available communication channel;
receiving a global positioning signal of the communication device from a global positioning device in communication with the data processing hardware;
receiving an orbital location of the target platform from the target platform;
determining an antenna pointing angle with respect to the target platform and associated with an antenna positioned on the communication device based on the global positioning signal of the communication device and the orbital location of the target platform; and
modifying the pseudo random noise spreading code based on the antenna pointing angle.

12. The communication system of claim 11, wherein the control inputs include at least one of a geolocation, an antenna gain-to-noise-temperature associated with the target platform, an equivalent isotropically radiated power associated with the target platform, an antenna pointing angle associated with the communication device, a received signal strength indicator of the target platform, or a signal-to-noise ratio of a communication between the target platform and the communication device.

13. The communication system of claim 12, wherein the operations further comprise adjusting the pseudo random noise spreading code when at least one of the control inputs is updated.

14. The communication system of claim 11, wherein the phased array antenna is disposed on a ground station or a source target platform and comprises:
antennas disposed on a micro strip; and
a phase shifter connected to at least one of the antennas.

15. The communication system of claim 11, wherein the operations further comprise, before modifying the communication signal, generating the communication signal.

16. The communication system of claim 11, wherein the operations further comprise, before modifying the communication signal, receiving the communication signal.

17. The communication system of claim 11, wherein establishing the communication connection between the target platform and the phased array antenna comprises steering one or more array elements of the phased array antenna to move a corresponding communication beam.

18. The communication system of claim 11, wherein identifying the target platform comprises querying a data source stored in memory hardware in communication with the data processing hardware for a target platform for communication with the phased array antenna and available communication channels for transmitting the communication signal at a communication time of the transmission of the modified communication signal from the phased array antenna.

* * * * *